(12) United States Patent
Lin

(10) Patent No.: US 8,926,109 B2
(45) Date of Patent: Jan. 6, 2015

(54) ILLUMINATION SYSTEM

(75) Inventor: Hung-Ying Lin, Taoyuan Hsien (TW)

(73) Assignee: Delta Electronics, Inc., Taoyuan Hsien (TW)

(*) Notice: Subject to any disclaimer, the term of this patent is extended or adjusted under 35 U.S.C. 154(b) by 387 days.

(21) Appl. No.: 13/355,402

(22) Filed: Jan. 20, 2012

(65) Prior Publication Data

US 2012/0243205 A1 Sep. 27, 2012

Related U.S. Application Data

(60) Provisional application No. 61/466,504, filed on Mar. 23, 2011.

(51) Int. Cl.
*F21V 9/16* (2006.01)
*G03B 21/20* (2006.01)
*G03B 33/08* (2006.01)
*H04N 9/31* (2006.01)

(52) U.S. Cl.
CPC .......... *G03B 21/204* (2013.01); *G03B 21/2066* (2013.01); *G03B 33/08* (2013.01); *H04N 9/3111* (2013.01); *H04N 9/3164* (2013.01)
USPC ............................................. 362/84; 362/231

(58) Field of Classification Search
USPC ........... 362/84, 509–510, 538, 539, 230, 231, 362/296.01, 293, 280, 200, 201, 202, 245, 362/246, 213, 252, 225, 341, 259, 311.01, 362/311.02, 311.03, 311.04, 311.05, 362/311.06, 311.07, 311.08, 296.06, 362/311.11, 311.12, 516, 240, 235, 292, 34, 362/232, 233, 85, 257; 353/84, 98, 94, 20, 353/37, 34, 99, 82; 359/634, 648, 649, 650, 359/651, 664, 364; 348/335, 336, 337, 338, 348/339, 742, 743; 345/30–48, 905; 257/90
See application file for complete search history.

(56) References Cited

U.S. PATENT DOCUMENTS

| | | | | |
|---|---|---|---|---|
| 4,557,603 | A * | 12/1985 | Oehler et al. | 356/418 |
| 6,320,553 | B1 * | 11/2001 | Ergene | 343/781 P |
| 6,710,909 | B2 | 3/2004 | Naito | |
| 7,070,300 | B2 | 7/2006 | Harbers et al. | |
| 7,234,820 | B2 | 6/2007 | Harbers et al. | |
| 7,408,201 | B2 | 8/2008 | Keuper et al. | |
| 2004/0165155 | A1 | 8/2004 | Lee et al. | |
| 2005/0270775 | A1 | 12/2005 | Harbers et al. | |

(Continued)

FOREIGN PATENT DOCUMENTS

| | | |
|---|---|---|
| CN | 1825198 | 8/2006 |
| CN | 101937162 | 1/2011 |

(Continued)

*Primary Examiner* — Anh Mai
*Assistant Examiner* — Fatima Farokhrooz
(74) *Attorney, Agent, or Firm* — Grossman, Tucker, Perreault & Pfleger, PLLC

(57) ABSTRACT

An illumination system for use in a projector is provided. The illumination system comprises a first light source, a first timing controlling unit, a curved reflecting component and a wavelength converting component. The first light source provides a first wavelength light, while the first timing controlling unit divides the first wavelength light into a first timing portion and a second timing portion. The curved reflecting component comprises a focal point. The wavelength converting component is disposed at the focal point for converting the first timing portion of the first wavelength light into a second wavelength light.

17 Claims, 20 Drawing Sheets

(56) References Cited

U.S. PATENT DOCUMENTS

| | | |
|---|---|---|
| 2009/0052189 A1 | 2/2009 | Kon |
| 2009/0128781 A1 | 5/2009 | Li |
| 2010/0328554 A1 | 12/2010 | Shibasaki |
| 2010/0328632 A1 | 12/2010 | Kurosaki et al. |
| 2011/0149549 A1* | 6/2011 | Miyake ........................... 362/84 |
| 2013/0242232 A1* | 9/2013 | Kimura et al. .................. 349/70 |

FOREIGN PATENT DOCUMENTS

| | | |
|---|---|---|
| JP | 2004-354495 | 12/2004 |
| JP | 2005-347263 | 12/2005 |
| TW | 201109720 | 3/2011 |

* cited by examiner

ILLUMINATION SYSTEM

This application claims priority of an U.S. Provisional Patent Application No. 61/466,504 filed on Mar. 23, 2011, which is entirely incorporated herein by reference.

BACKGROUND OF THE INVENTION

1. Field of the Invention

The present invention relates to an illumination system, and more particularly, to an illumination system for a projector.

2. Descriptions of the Related Art

Solid state light sources such as light emitting diodes (LEDs) or lasers have a long service life, a small volume and mercury-free. However, when being used as light sources for projectors, solid state light sources are still inferior to conventional high-pressure mercury lamps in terms of the luminance they provide. Therefore, although the solid state light sources are used more widely, they have not yet completely replaced the conventional high-pressure mercury lamps in the field of projection apparatuses.

On the other hand, to enable a light source in a projector to uniformly project light of the three primary colors (red, blue and green) to facilitate the coupling operation performed by a light coupling assembly disposed in the projector, the following two approaches are mostly used in the prior art to output the light of the three primary colors (red, blue and green). The first approach is to use a solid state light source to project a white light, and then enable the white light to pass through a color wheel with red, blue and green colors to generate the corresponding red, blue and green timing light, respectively for light coupling and output. The second approach is to use the blue laser as a solid state light source to excite phosphor powders coated on the rotary disk to generate a red, blue, green or yellow light, and then couple the blue light emitted by the blue laser with the red, green or yellow light for output, thereby obtaining the desired image.

In detail, an illumination system using the blue laser as the solid state light source in the second approach is as shown in FIG. 8. The illumination system 800 in a projector of the prior art comprises a blue laser light source 810, a red LED light source 820, a first color separating mirror 830, a second color separating mirror 840, a mirror wheel 850, two reflecting mirrors 860 and a light homogenizing component 870. A specific area of the mirror wheel 850 is coated with a green phosphor, and an uncoated portion thereof is a transmitting area.

When blue light 801 of the blue laser light source 810 passes through the first color separating mirror 830 to the specific area of the mirror wheel 850, the green phosphor is excited to generate a green light 802, which is then reflected by the first color separating mirror 830 to the light homogenizing component 870; when the blue light 801 is projected to the transmitting area of the mirror wheel 850 and is transmitted therethrough, the blue light 801 is reflected by the reflecting mirrors 860 behind the transmitting area and by the second color separating mirror 840 to the light homogenizing component 870. On the other hand, a red light 803 provided by the red LED light source 820 passes through the first color separating mirror 830 and the second color separating mirror 840 to the light homogenizing component 870.

However, although the aforesaid two approaches can use the light beams emitted by the solid state light sources to form the red, blue and green light (and optionally, a yellow light) for light coupling purposes, both the aforesaid approaches result in divergent light and suffer from low efficiency due to limitations of inherent optical properties of the light sources. In particular for the second approach, the blue light for exciting the green phosphor cannot be fully converted into the green light and the blue light must be recycled by the reflecting mirrors from behind, which makes the optical path of the blue light elongated; consequently, this light coupling approach fails to provide an effective solution in terms of the blue light and the green light that is generated through excitation.

Therefore, the light coupling approaches of the prior art not only provide a limited effect in improving the efficiency of generating the green light, but also increase the volume, weight and manufacturing cost of the overall system due to the use of reflecting mirrors, which makes the related products uncompetitive in the market.

Accordingly, an urgent need exists in the art to increase the utilization efficiency of the light sources.

SUMMARY OF THE INVENTION

An objective of the present invention is to provide an illumination system for a projector. Through the use of a curved reflecting component and a wavelength converting component, the illumination system converts a first timing portion of a first wavelength light provided by a first light source into a second wavelength light and emits the second wavelength light in a convergent but not divergent manner; and through the use of a light homogenizing component, the illumination system couples a second timing portion of the first, second and third wavelength light of a second light source after receiving them and then uniformly emits them outwards.

To achieve the aforesaid objective, the illumination system of the present invention comprises a first light source, a first timing controlling unit, a curved reflecting component and a wavelength converting component. The first light source provides a first wavelength light, while the first timing controlling unit divides the first wavelength light into a first timing portion and a second timing portion. The curved reflecting component has a focal point, while the wavelength converting component is disposed at the focal point for converting the first timing portion of the first wavelength light into a second wavelength light and then emitting the second wavelength light in a convergent manner, thereby achieving the advantages of concentrating the light and improving the luminance.

Another objective of the present invention is to provide an illumination system for a projector, which has a simple construction and can generate concentrated light of different wavelengths.

To achieve the aforesaid objective, the illumination system of the present invention comprises the following: two first light sources, each providing a first wavelength light; a curved reflecting component, disposed between the two first light sources and having two halves, a through groove and two transmitting portions that are disposed on the two halves respectively, wherein the through groove is disposed between the two halves; a timing controlling unit, having a rotary shaft and a rotary disk, wherein the rotary shaft is rotatable and the rotary disk is fixedly connected with the rotary shaft so that the rotary disk rotatably passes through the through groove; and a plurality of wavelength converting components, disposed on the rotary disk, wherein each of the wavelength converting components converts the first wavelength light into another wavelength light.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
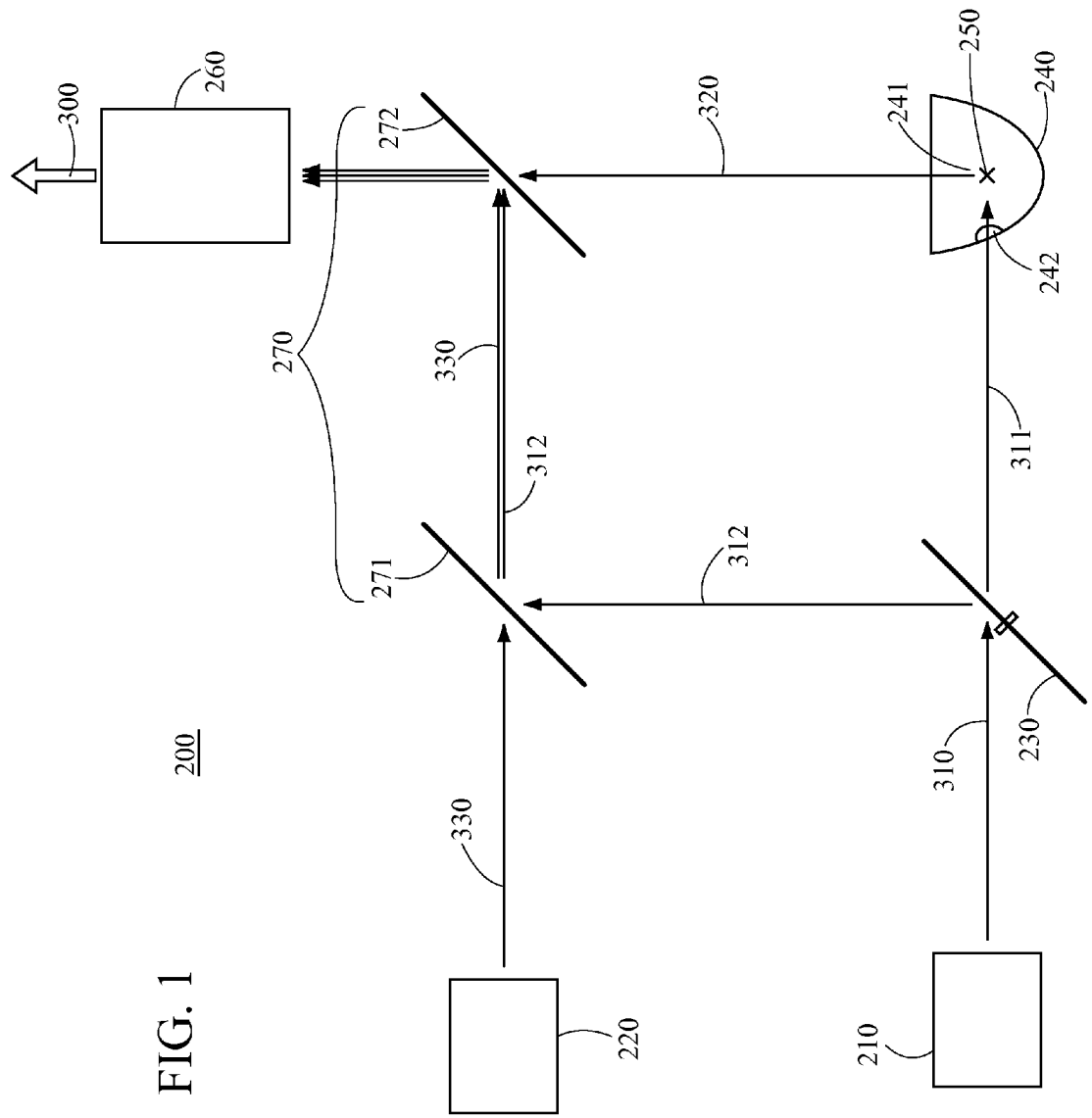
FIG. 1 is a schematic view of the first embodiment of an illumination system according to the present invention.

The first embodiment of an illumination system 200 for a projector according to the present invention is shown in FIG. 1. The illumination system 200 comprises a first light source 210, a second light source 220, a first timing controlling unit 230, a curved reflecting component 240, a wavelength converting component 250, a light homogenizing component 260 and at least one color separating mirror (i.e. a dichroic mirror) 270. The first light source 210 is adapted to provide a first wavelength light 310, while the second light source 220 is adapted to provide a third wavelength light 330. Meanwhile, the first timing controlling unit 230 is adapted to divide the first wavelength light 310 into a first timing portion 311 and a second timing portion 312. The wavelength converting component 250 is disposed at a focal point 241 of the curved reflecting component 240 so that when the wavelength converting component 250 receives the first timing portion 311 of the first wavelength light 310, the first timing portion 311 can be converted into a second wavelength light 320. The second wavelength light 320 is then reflected by the curved reflecting component 240 and is emitted outwards in a convergent manner.

Figure 3:
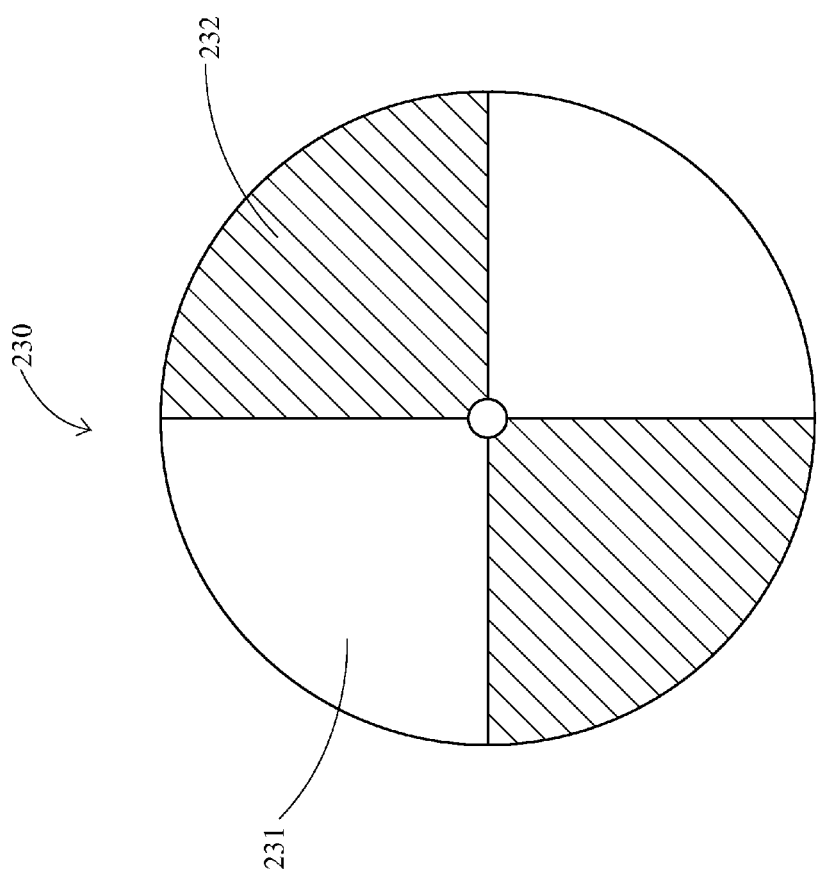
FIG. 3 is a schematic view of the first timing controlling unit of the illumination system according to the present invention.

In detail, the first timing controlling unit 230 of the present invention has at least one transmitting portion 231 and at least one reflecting portion 232. Preferably in this embodiment, the first timing controlling unit 230 has two transmitting portions 231 and two reflecting portions 232. The transmitting portions 231 are arranged alternately with the reflecting portions 232 as shown in FIG. 3. In the first embodiment shown in FIG. 1, when the first wavelength light 310 is transmitted through the transmitting portions 231 of the first timing controlling unit 230, the first timing portion 311 of the first wavelength light 310 is formed; and when the first wavelength light 310 is reflected by the reflecting portions 232 of the first timing controlling unit 230, the second timing portion 312 of the first wavelength light 310 is formed.

Furthermore, as shown in FIG. 1, the at least one color separating mirror 270 of this embodiment preferably includes a first color separating mirror 271 and a second color separating mirror 272. The first color separating mirror 271 is disposed adjacent to the second light source 220 to reflect the second timing portion 312 of the first wavelength light 310 and to allow the third wavelength light 330 to pass therethrough. The second color separating mirror 272 is disposed adjacent to the light homogenizing component 260 to reflect the second timing portion 312 of the first wavelength light 310 and the third wavelength light 330 and to allow the second wavelength light 320 to pass therethrough.

Hereinafter, the traveling paths of the first wavelength light 310, the second wavelength light 320 and the third wavelength light 330 in the first embodiment of the illumination system 200 will be described.

As shown in FIG. 1, when the first wavelength light 310 is emitted by the first light source 210 to the first timing controlling unit 230, a portion of the first wavelength light 310 that passes through the transmitting portions 231 of the first timing controlling unit 230 forms the first timing portion 311. Then, the first timing portion 311 passes through a hole 242 formed in the curved reflecting component 240 to the wavelength converting component 250 located at the focal point 241 of the curved reflecting component 240. Upon receiving the first timing portion 311 of the first wavelength light 310, the wavelength converting component 250 converts the first timing portion 311 into the second wavelength light 320, which is then reflected and converged by the curved reflecting component 240 to the second color separating mirror 272. Then, the second wavelength light 320 passes through the second color separating mirror 272 before reaching the light homogenizing component 260.

It shall be appreciated that the wavelength converting component 250 may be fixedly disposed at the focal point 241 of the curved reflecting component 240 by use of a support or some other fixing means; the present invention has no limitation thereon. Furthermore, the first timing portion 311 of this embodiment is projected to the curved reflecting component 240 via the hole 242; however, in other embodiments, a color separating film ((i.e. dichroic film) may be disposed on the hole so that the first wavelength light passes through the hole via the color separating film, while the second wavelength light is reflected by the color separating film back to the curved reflecting component, thus increasing the overall utilization efficiency of the light.

On the other hand, a portion of the first wavelength light 310 that is reflected by the reflecting portions 232 of the first timing controlling unit 230 forms the second timing portion 312. The second timing portion 312 of the first wavelength light 310 travels towards the first color separating mirror 271 and is then reflected by the first color separating mirror 271 and the second color separating mirror 272 sequentially to also be received by the light homogenizing component 260.

Finally, the third wavelength light 330 emitted by the second light source 220 firstly passes through the first color separating mirror 271, and is then reflected by the second color separating mirror 272 to be received by the light homogenizing component 260.

Thereby, after the second timing portion 312 of the first wavelength light 310, the second wavelength light 320 and the third wavelength light 330 are all received and homogenized by the light homogenizing component 260, a light 300 with a uniform brightness can be formed and provided to an imaging system (not shown) for imaging.

In this embodiment, the first light source 210 is a blue laser light source. The first wavelength light 310 is a blue light. The second light source 220 is a red light emitting diode (LED) light source or a red laser light source. The third wavelength light 330 is a red light. The wavelength converting component 250 is a green phosphor and correspondingly, the second wavelength light 320 is a green light. The curved reflecting component 240 has a curved surface which, in the present invention, is an ellipsoidal surface or a parabolic surface for converging and reflecting the second wavelength light 320 obtained through conversion.

Figure 2:
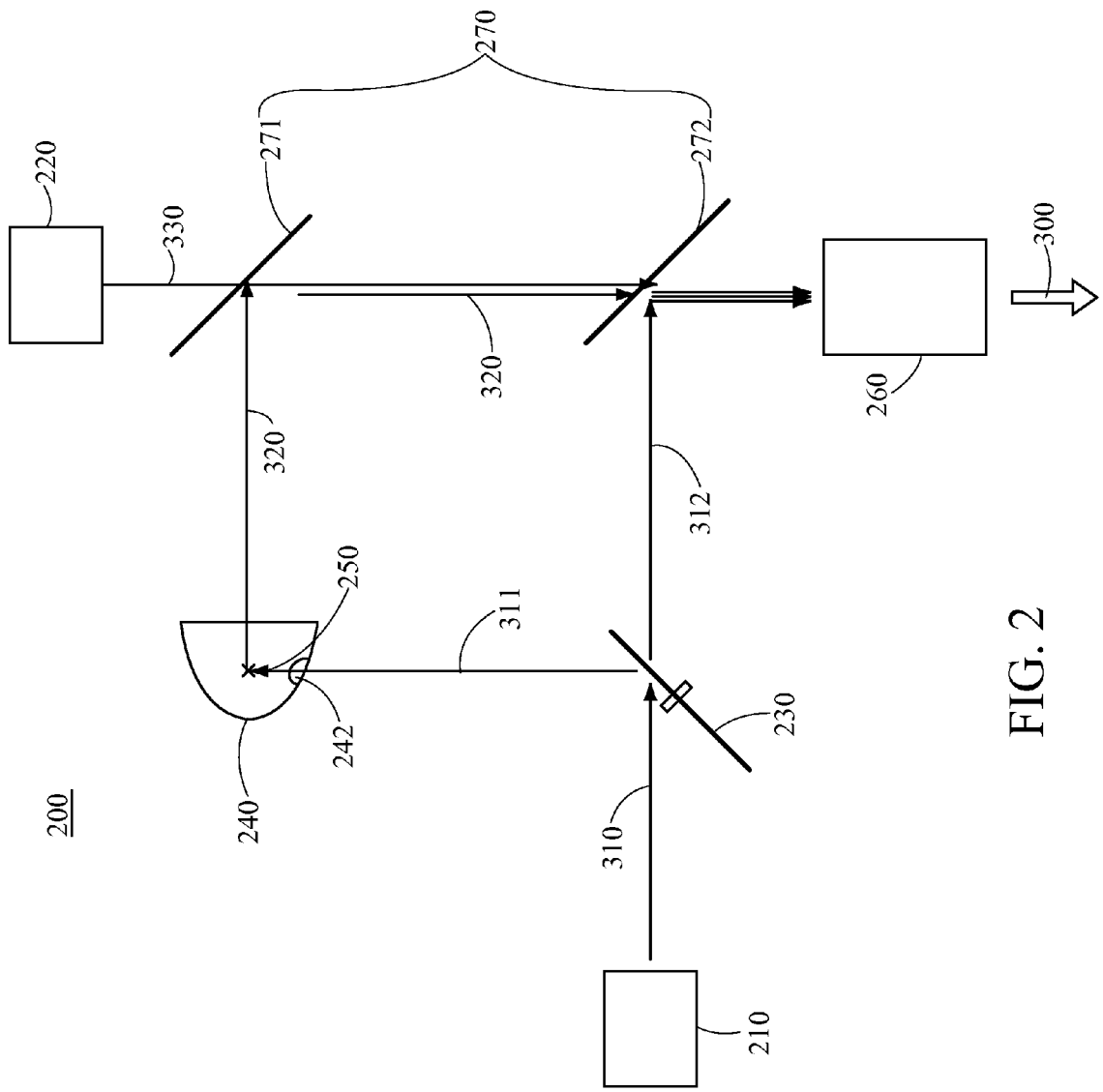
FIG. 2 is a schematic view of the second embodiment of the illumination system according to the present invention.

The second embodiment of the illumination system 200 of the present invention is shown in FIG. 2. Similarly, the illumination system 200 comprises the first light source 210, the second light source 220, the first timing controlling unit 230, the curved reflecting component 240, the wavelength converting component 250, the light homogenizing component 260, the first color separating mirror 271 and the second color separating mirror 272; all the positional relationships among these components are substantially the same as those of the first embodiment.

The traveling paths of the first wavelength light 310, the second wavelength light 320 and the third wavelength light 330 in the second embodiment will be described as follows. As shown in FIG. 2, when the first wavelength light 310 is emitted by the first light source 210, the first timing portion 311 of the first wavelength light 310 is reflected by the reflecting portions 232 of the first timing controlling unit 230 and then passes through the hole 242 formed in the curved reflecting component 240 to the wavelength converting component 250 located at the focal point 241 of the curved reflecting component 240. The wavelength converting component 250 converts the first timing portion 311 of the first wavelength light 310 into the second wavelength light 320, which is then reflected and converged by the curved reflecting component 240 to the first color separating mirror 271. Then, the second wavelength light 320 is reflected by the first color separating mirror 271, and is transmitted through the second color separating mirror 272 to be received by the light homogenizing component 260. Furthermore, after the second timing portion 312 of the first wavelength light 310 is transmitted through the transmitting portions 231 of the first timing controlling unit 230, the second timing portion 312 is reflected by the second color separating mirror 272 to be received by the light homogenizing component 260. Finally, the third wavelength light 330 emitted by the second light source 220 is transmitted through the first color separating mirror 271 and the second color separating mirror 272 sequentially to be received by the light homogenizing component 260.

The first embodiment and the second embodiment of the present invention differ from each other in that in the first embodiment, the transmitting portions 231 of the first timing controlling unit 230 allow the first timing portion 311 of the first wavelength light 310 to pass therethrough, and the reflecting portions 232 of the first timing controlling unit 230 are adapted to reflect the second timing portion 312 of the first wavelength light 310. However, in the second embodiment, the transmitting portions 231 of the first timing controlling unit 230 allow the second timing portion 312 of the first wavelength light 310 to pass therethrough, while the reflecting portions 232 of the first timing controlling unit 230 are adapted to reflect the first timing portion 311 of the first wavelength light 310. Furthermore, in the first embodiment, the third wavelength light 330 emitted by the second light source 220 is transmitted through the first color separating mirror 271 and is then reflected by the second color separating mirror 272; but in the second embodiment, the third wavelength light 330 emitted by the second light source 220 is directly transmitted through the first color separating mirror 271 and the second color separating mirror 272 sequentially.

Figure 4:
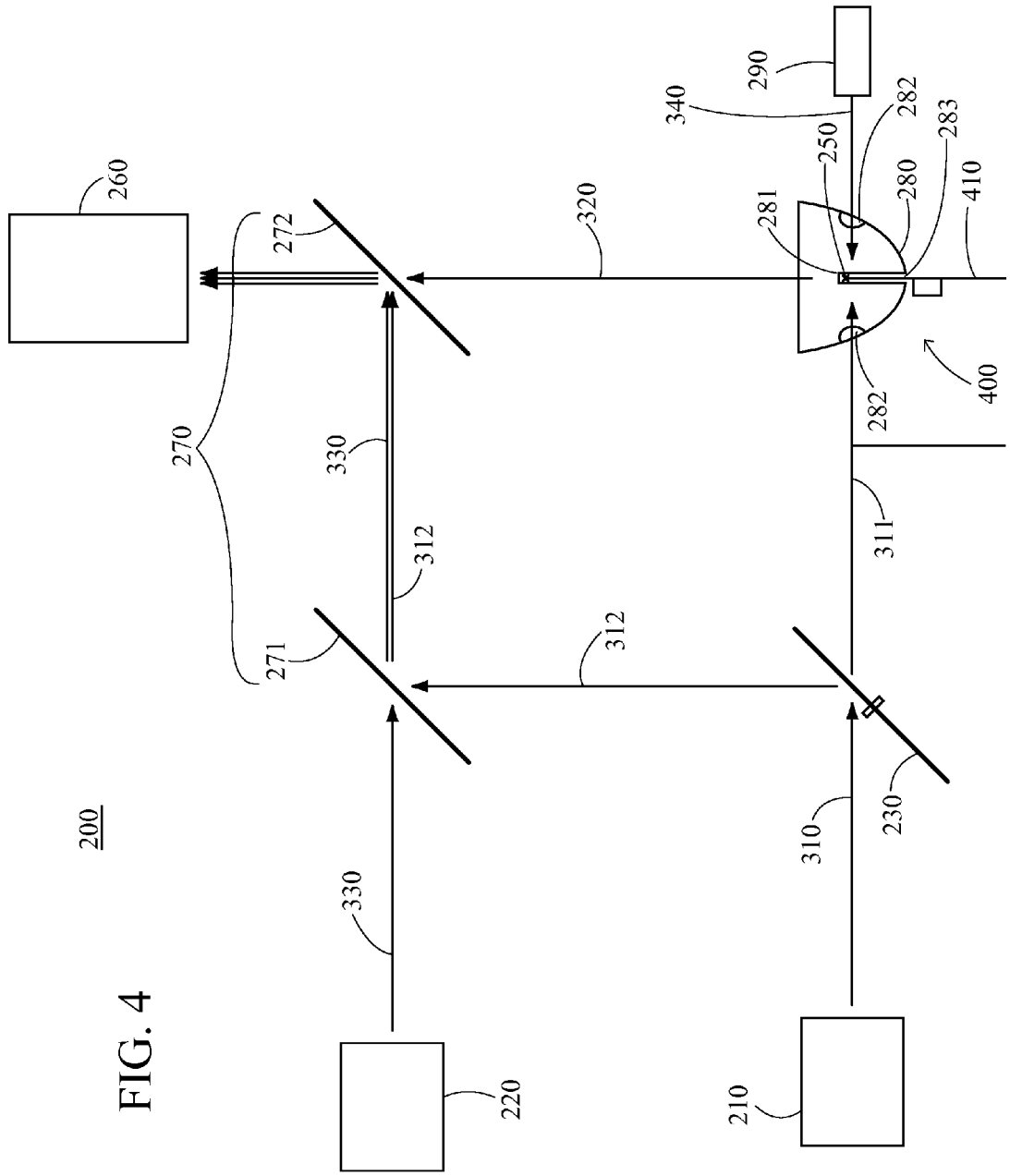
FIG. 4 is a schematic view of the third embodiment of the illumination system according to the present invention.

FIG. 4 shows the third embodiment of the present invention. The illumination system of the third embodiment also comprises the first light source 210, the second light source 220, the first timing controlling unit 230, the wavelength converting component 250, the light homogenizing component 260, the first color separating mirror 271 and the second color separating mirror 272, and all the positional relationships among these components are also substantially the same as those in the first embodiment. The third embodiment differs from the first embodiment in that the third embodiment further comprises a second timing controlling unit 400 and a third light source 290. In addition, the original curved reflecting component 240 with a hole 242 is replaced with a curved reflecting component 280 with two holes 282 and an opening 283. Through this arrangement, the overall intensity of the light is further enhanced.

In detail, the second timing controlling unit 400 comprised in the third embodiment is adapted to divide the first timing portion 311 of the received first wavelength light 310 into a third timing portion (not shown) and a fourth timing portion (not shown); the third timing portion has the same timing as the second timing portion 312. The second timing controlling unit 400 comprises a rotary disk 410 that is rotatable, and the direction of the rotation axis of the rotary disk 410 may be perpendicular to the direction of exiting light from the curved reflecting component 280.

Figure 5:
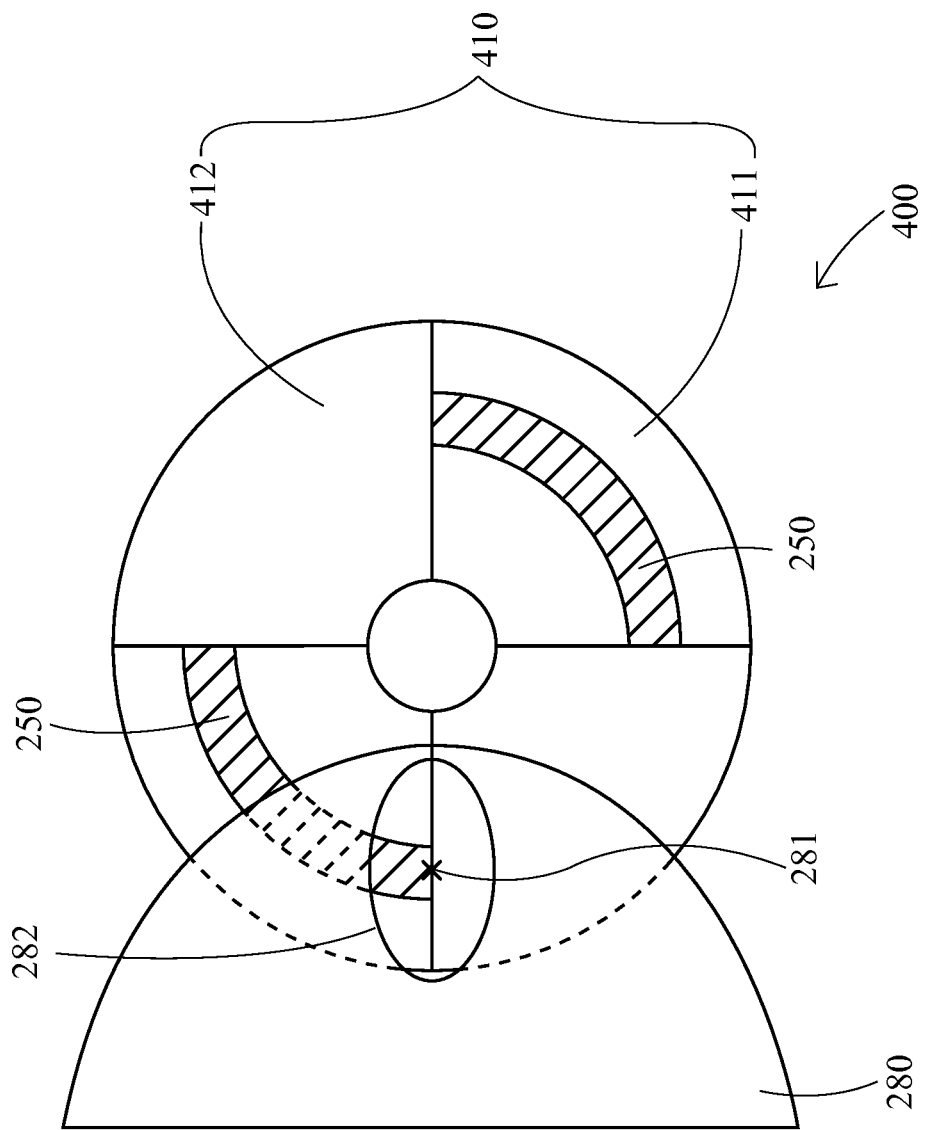
FIG. 5 is a schematic view of the second timing controlling unit and the curved reflecting component of the illumination system according to the present invention.

The rotary disk 410 has at least one converting portion (or converting region) and at least one reflecting portion (or reflecting region). As shown in FIG. 5, in this embodiment, the rotary disk 410 preferably has two converting portions 411 and two reflecting portions 412 on each of the two surfaces thereof, and the two converting portions 411 are arranged alternately with the two reflecting portions 412. The wavelength converting component 250 is formed on each of the converting portions 411 respectively.

Figure 6:
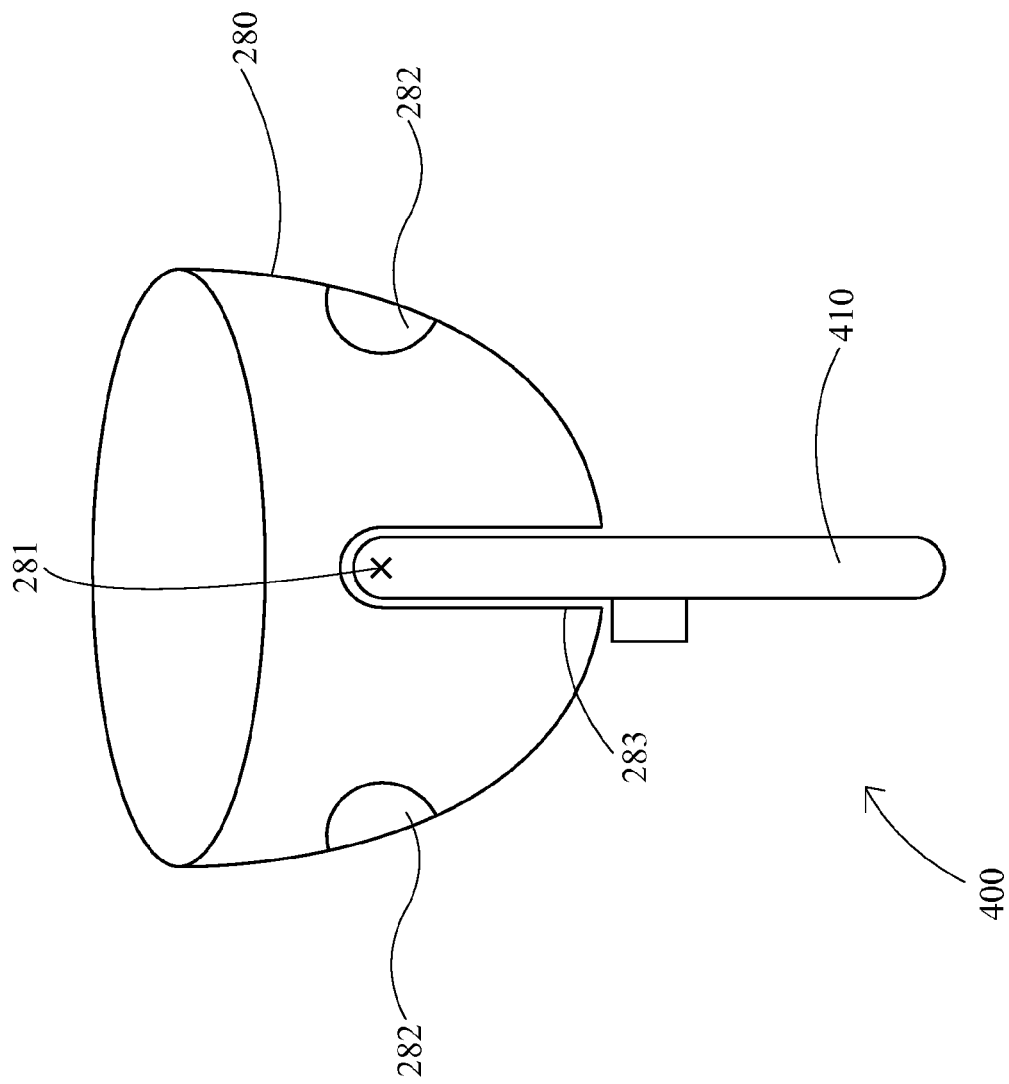
FIG. 6 is a schematic view of the curved reflecting component comprised in the third embodiment of the illumination system according to the present invention.

With reference to FIG. 6 together, the curved reflecting component 280 comprised in the third embodiment has the following components: a focal point 281, two holes 282 disposed on two sides of the curved reflecting component 280 respectively with respect to the focal point 281, and an opening 283. The rotary disk 410 of the second timing controlling unit 400 can be partially disposed in the curved reflecting component 280 via the opening 283 of the curved reflecting component 280.

As the rotary disk 410 rotates with respect to the curved reflecting component 280, the converting portions 411 and the reflecting portions 412 pass through the focal point 281 alternately so that the wavelength converting component 250 formed on the converting portions 411 is intermittently located at the focal point 281. In other words, the wavelength converting component 250 of this embodiment is not fixedly located at the focal point 281 all the time, but is located at the focal point 281 intermittently as the rotary disk 410 rotates.

Thereby, when the first wavelength light 310 is emitted by the first light source 210 to the first timing controlling unit 230, a portion of the first wavelength light 310 that passes through the transmitting portions 231 of the first timing controlling unit 230 forms the first timing portion 311. Then, the first timing portion 311 passes through the hole 242 formed in the left side of the curved reflecting component 240 to the second timing controlling unit 400 and is projected onto the second timing controlling unit 400.

A portion of the first timing portion 311 that is projected to the converting portions 411 of the second timing controlling unit 400 is the fourth timing portion. The fourth timing portion is converted by the wavelength converting component 250 onto the converting portions 411 into the second wavelength light 320, which is then converged by the curved reflecting component 280 for emission outwards. Similarly, a portion of the first timing portion 311 that is projected to the reflecting portions 412 of the second timing controlling unit 400 is the third timing portion. The third timing portion has the same timing as the second timing portion 312 but differs in that the third timing portion is emitted outwards from the curved reflecting component 280.

The third light source 290, which is disposed adjacent to a side of the curved reflecting component 280 and opposite to the first light source 210, is adapted to provide a fourth wavelength light 340. When traveling into the curved reflecting component 280 via the hole 282 on the right side, the fourth wavelength light 340 is also projected onto the converting portions 411 or the reflecting portions 412 of the second timing controlling unit 400 to form the fourth timing portion or the third timing portion respectively.

As described above, the wavelength converting component 250 is adapted to convert the fourth wavelength light 340 into the second wavelength light 320 for emission outwards. On the other hand, the third timing portion projected to the reflecting portions 412 of the second timing controlling unit 400 has the same timing as the second timing portion 312 and is converged by the curved reflecting component 280 for emission outwards. Each of the two holes 282 may also be additionally provided with a color separating film, which allows the first wavelength light and the fourth wavelength light to pass through the holes but reflects the second wavelength light back to the curved reflecting component, thereby improving the utilization factor of the light.

Figure 7:
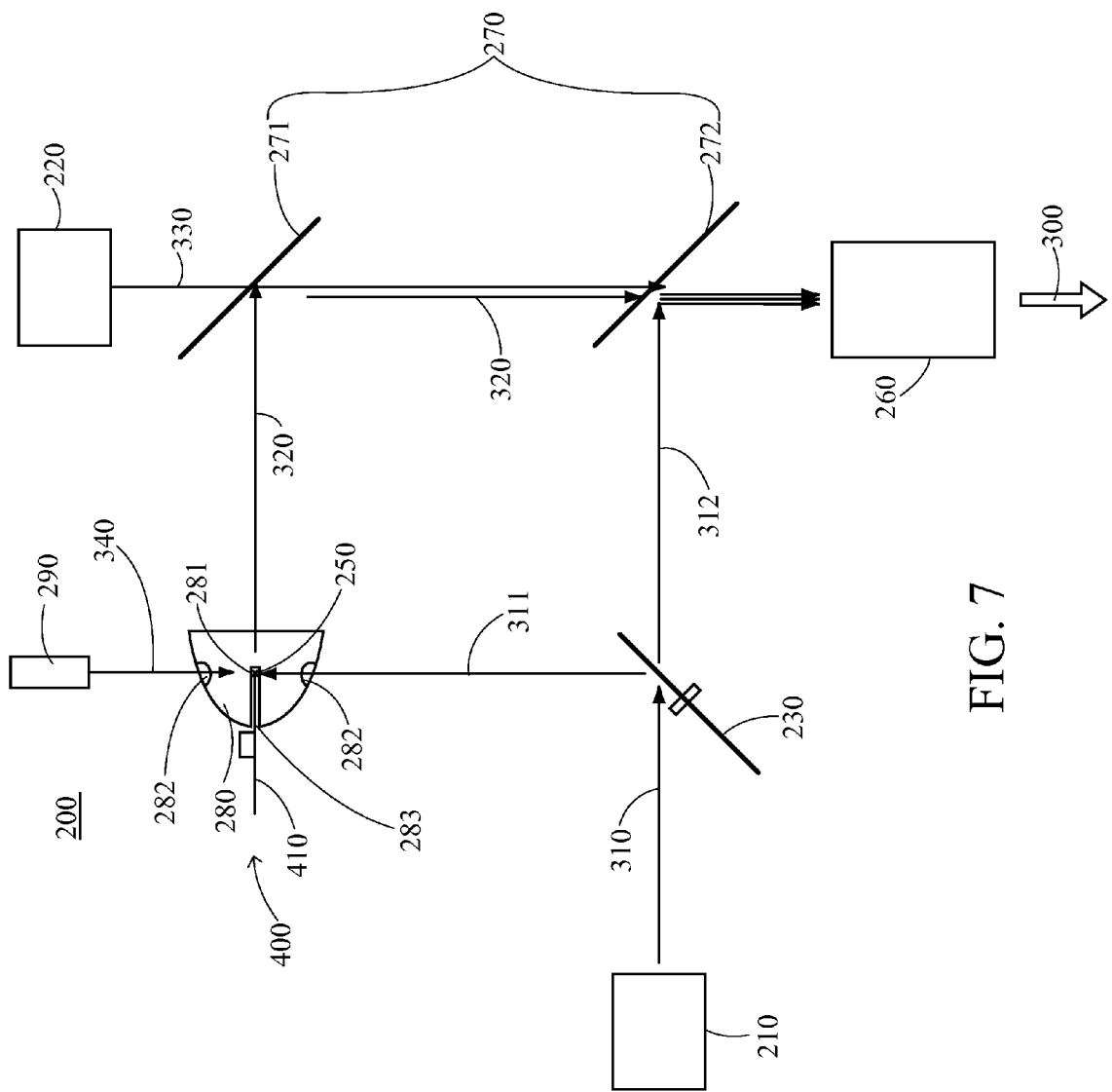
FIG. 7 is a schematic view of the fourth embodiment of the illumination system according to the present invention.
Figure 8:
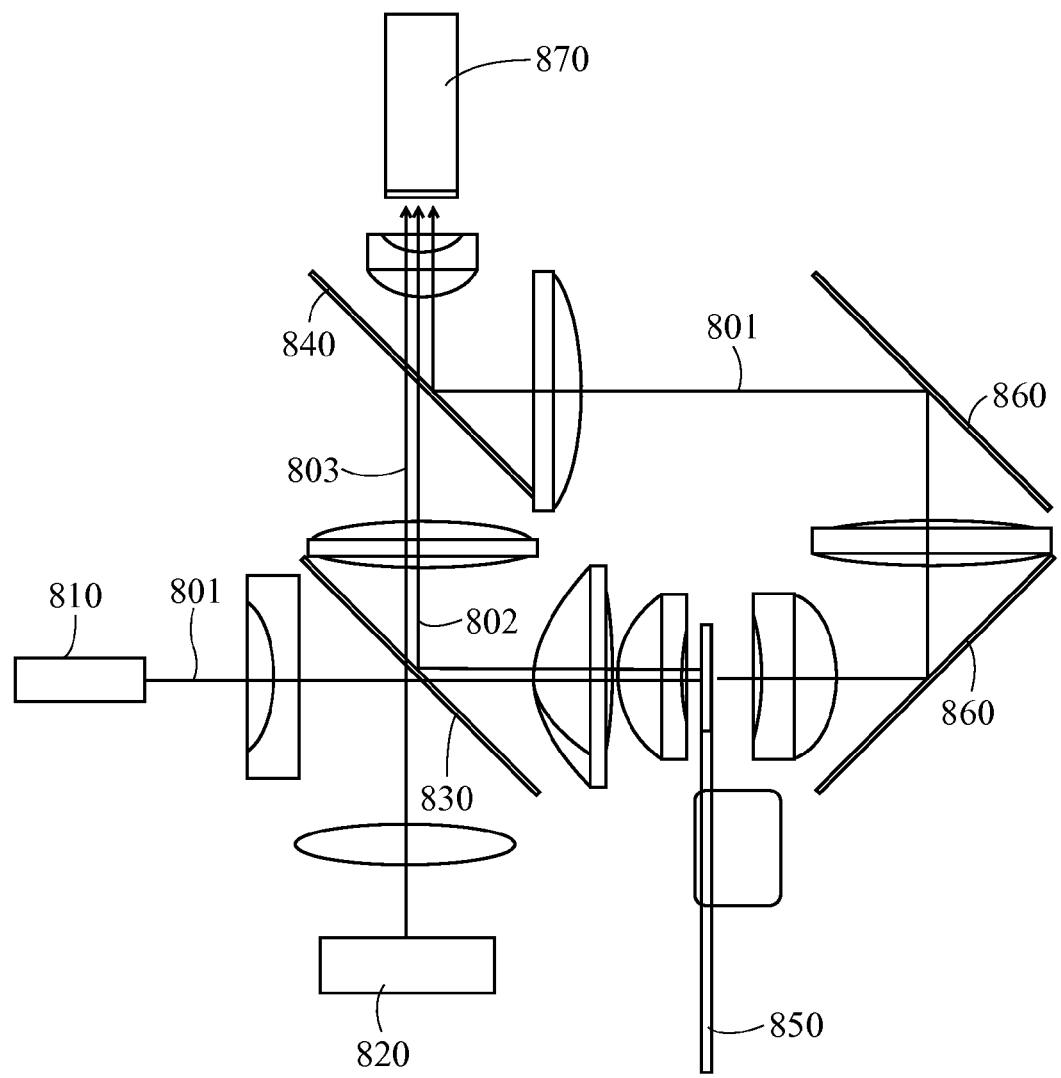
FIG. 8 is a schematic view of an illumination system of the prior art.

The second timing controlling unit 400 and the third light source 290 described in the third embodiment may also be disposed similarly in the second embodiment to obtain a fourth embodiment as shown in FIG. 7. The optical paths of the wavelength lights and the timing portions are all similar to those of the second embodiment and the functions of the second timing controlling unit 400 and the third light source 290 have also been described in the third embodiment, so these will not be further described herein.

Although the first embodiment, the second embodiment, the third embodiment and the fourth embodiment all disclose the technical features of using the wavelength converting component 250 to excite the first timing portion 311 of the first wavelength light 310 and generate the second wavelength light 320, the arrangement of the optical components may be adjusted as desired. For example, a plurality of relay lenses or a lens array may be additionally provided on the light exiting surface of each of the light sources or on the incident surface of the light homogenizing component to improve the condensing effect, so the present invention is not only limited to the aforesaid embodiments. Moreover, both the first and second timing controlling unit may comprise a mirror wheel or a polygonal reflecting mirror.

Through the aforesaid arrangement of the optical components, the preferred embodiment of the illumination system of the present invention only needs the use of two distinct light sources (i.e., a blue light source and a red light source) and a wavelength converting component (i.e., a green phosphor) but can still allow the light homogenizing component to homogenize the second timing portion and the third timing portion (i.e., the blue light) of the first wavelength light, the second wavelength light (i.e., the green light) and the third wavelength light (i.e., the red light) respectively to generate concentrated light rays with a uniform brightness for use in a projector. Thereby, problems such as divergent projection angles and a low light formation efficiency in the prior art solid state light sources can be avoided. Meanwhile, by additionally providing a third light source (i.e., a blue light source), the intensity of the green light can be doubled to improve the luminance, the color performance and the image quality of the projector.

The illumination system of the present invention may still have other preferred embodiments, which can also improve the luminance, the color performance and the image quality of the projector.

Figure 9:
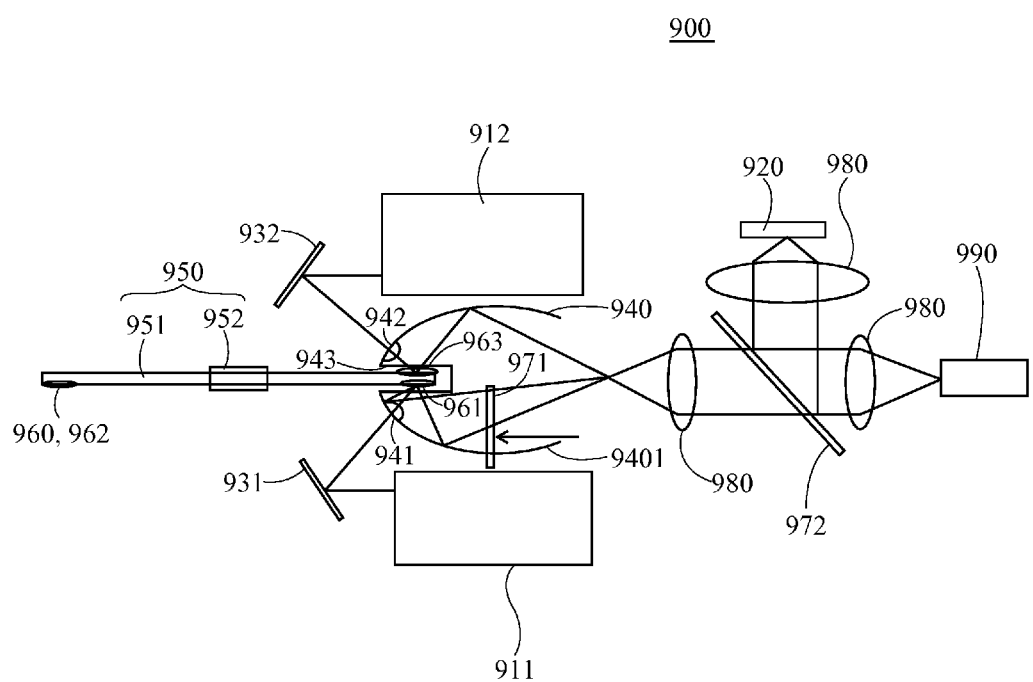
FIG. 9 is a schematic view of the fifth embodiment of the illumination system according to the present invention.

FIG. 9 illustrates a schematic view of the fifth preferred embodiment of an illumination system for a projector according to the present invention. The illumination system 900 comprises two first light sources 911, 912, a second light source 920, two reflecting mirrors 931, 932, a curved reflecting component 940, a timing controlling unit 950, a plurality of wavelength converting components 960, an internal color separating mirror 971, an external color separating mirror 972, a plurality of condensing lenses 980 and a light homogenizing component 990, which will be sequentially described as follows.

The two first light sources 911, 912 are each adapted to generate a first wavelength light, and the second light source 920 is adapted to generate a second wavelength light. In this embodiment, the two first light sources 911, 912 may each be a blue laser light source, while the second light source 920 may be a blue LED; correspondingly, both the first and second wavelength lights are a blue wavelength light.

Figure 10:
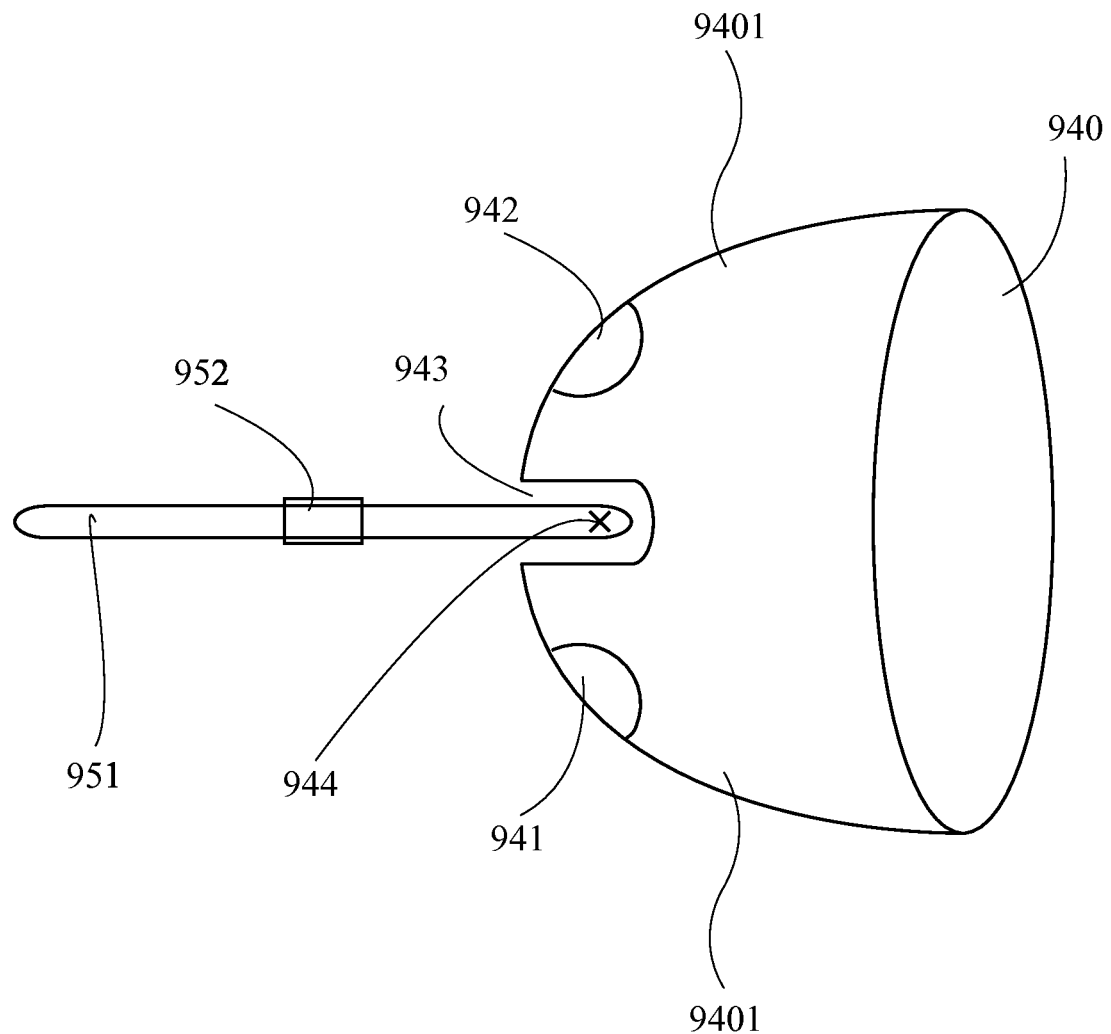
FIG. 10 is a schematic view of the timing controlling unit and the curved reflecting component of the illumination system shown in FIG. 9.

FIG. 10 illustrates a schematic view of the curved reflecting component and the timing controlling unit of the illumination system shown in FIG. 9. The curved reflecting component 940 (also known as a curved reflecting mirror or a curved reflecting cup) may be located between the two first light sources 911, 912, and is adapted to converge the light. The curved reflecting component 940 may have at least one curved surface, which may be an ellipsoidal surface or a parabolic surface.

The curved reflecting component 940 may have two transmitting portions 941, 942, a through groove 943 and a focal point 944. The through groove 943 is formed at a vertex of the curve reflecting component 940 and extends through an outer surface to an inner surface of the curved reflecting component 940. The two transmitting portions 941, 942 are formed on two sides of the through groove 943 respectively, and may each be a through hole or a transparent material that allows the first wavelength light to pass therethrough into the curved reflecting component 940. The focal point 944 is located between the two transmitting portions 941, 942.

The inner surface of the curved reflecting component 940 except the transmitting portion 941 may be formed as a mirrored surface or be provided with a reflecting film (not shown) so that a third wavelength light to a fifth wavelength light, to be described later can be reflected when impinging on the inner surface of the curved reflecting component 940. In this way, the third to fifth wavelength light scattered within the curved reflecting component 940 can be reflected and converged by the inner surface of the curved reflecting component 940, and then be projected out of the curved reflecting component 940 with a small divergent angle.

Each of the transmitting portions 941, 942 may be optionally provided with a color separating film (not shown). The optical properties of the color separating film allow the first wavelength light to pass through the color separating film but reflect the third to fifth wavelength lights via the color separating film. When the color separating film is provided on each of the transmitting portions 941, 942, only the first wavelength light can pass through the transmitting portions 941, 942 into the curved reflecting component 940; the third to fifth wavelength light within the curved reflecting component 940 cannot pass through the transmitting portions 941, 942 to be projected out of the curved reflecting component 940.

It shall be appreciated that in this embodiment, the curved reflecting component 940 may be optionally made of a transparent material; a surface (either the inner or outer surface) of such a curved reflecting component 940 is provided with a color separating film which allows only the first wavelength light to pass therethrough. Thus, the first wavelength light can travel into the curved reflecting component 940 from any part of the curved reflecting component 940; that is, any part of the curved reflecting component 940 can play the role of the transmitting portions 941, 942. On the other hand, the third to fifth wavelength lights within the curved reflecting component 940 can be reflected and converged by the color separating film and then be projected out of the curved reflecting component 940 with a small divergent angle.

Additionally, the curved reflecting component 940 may be described as having two halves 9401. The two transmitting portions 941, 942 are disposed on the two halves 9401 respectively; the through groove 943 and the focal point 944 are disposed between the two halves 9401. The two halves 9401 may be symmetrical with each other, with an imaginary plane (not shown), in which the focal point 944 is located, acting as a symmetry plane of the two halves 9401.

The timing controlling unit 950 comprises a rotary disk 951 and a rotary shaft 9521; the rotary shaft 952 may be connected to a driving component (not shown) and driven by the driving component to rotate. The rotary disk 951 is fixedly connected to the rotary shaft 952 to rotate along with the rotary shaft 952. The rotary disk 951 rotatably passes through the through groove 943 of the curved reflecting component 940; that is, a periphery portion (a portion far from the rotary shaft 952) of the rotary disk 951 can pass through the through groove 943 into the curved reflecting component 940. The periphery portion of the rotary disk 951 may overlap the focal point 944, but the present invention is not limited thereto.

The radial direction of the rotary disk 951 may be parallel with the light exiting direction of the curved reflecting component 940. For example, in FIG. 9, the direction of exiting light from the curved reflecting component 940 is rightwards, so the rotary disk 951 is disposed with the radial direction thereof being rightwards; that is, the axial direction of the rotary shaft 952 faces upwards or downwards.

Figure 11A:
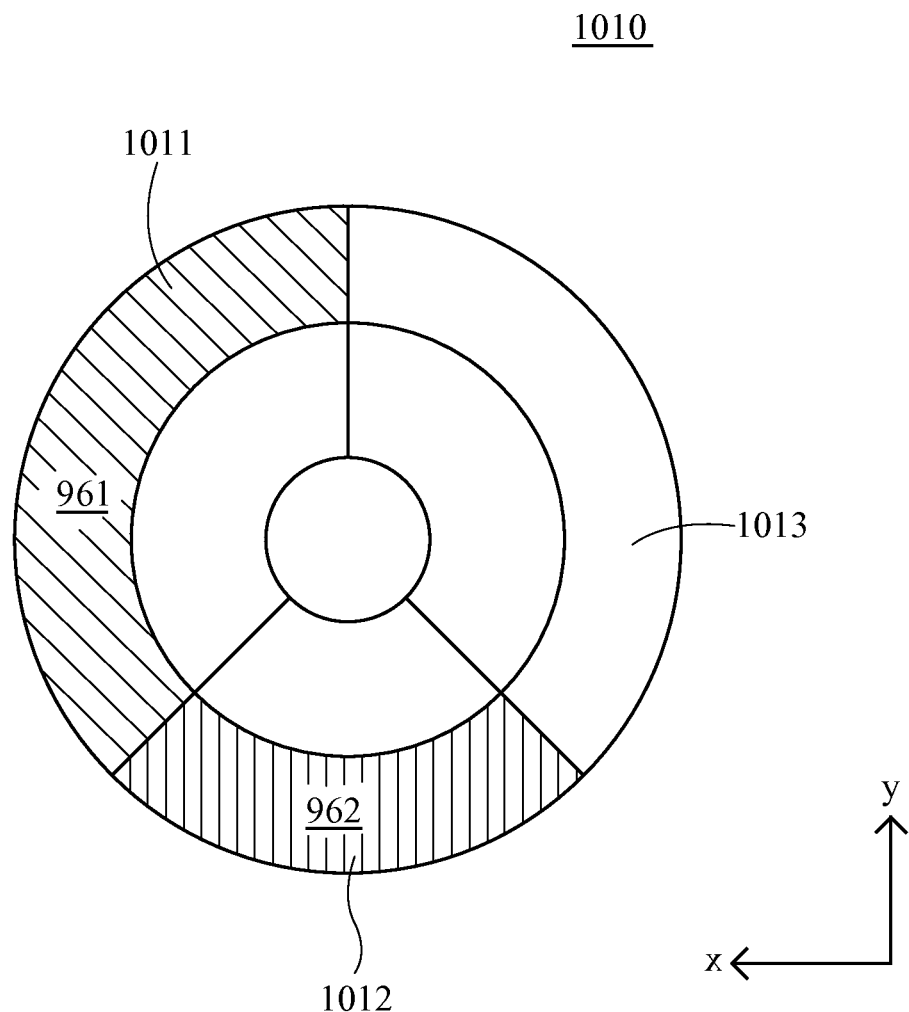
FIG. 11A is a top view of the timing controlling unit and the wavelength converting components of the illumination system shown in FIG. 9.
Figure 11B:
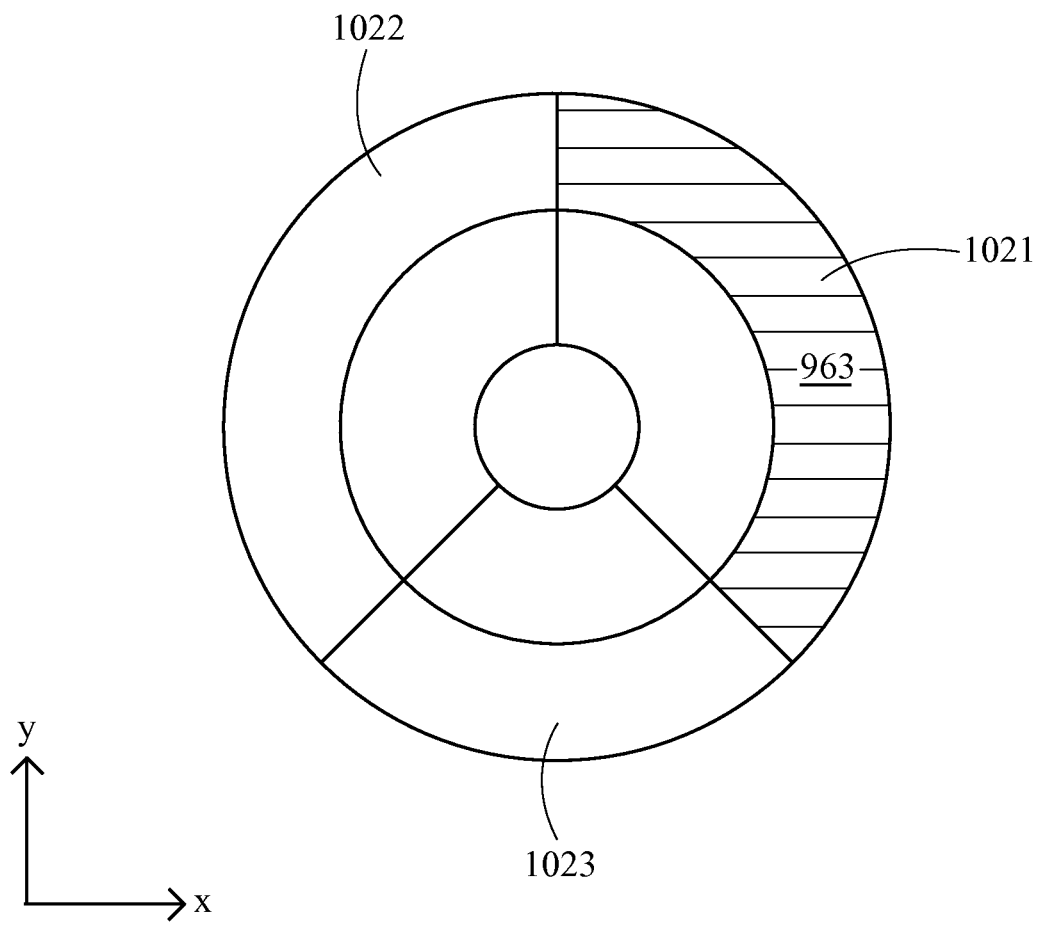
FIG. 11B is a bottom view of the timing controlling unit and the wavelength converting components of the illumination system shown in FIG. 9.

FIGS. 11A and 11B illustrate the top and bottom view of the timing controlling unit and the wavelength converting components of the illumination system of FIG. 9 respectively. The rotary disk 951 may be made of a transparent material and has a first surface 1010 and a second surface 1020 opposite to each other. Either the first surface 1010 or the second surface 1020 may be provided with a color separating film thereon to reflect the third to fifth wavelength light; that is, the third to fifth wavelength light are not allowed to pass through the rotary disk 951.

The first surface 1010 and the second surface 1020 each have at least one converting portion and at least one reflecting portion, both of which are located on the periphery portion of the rotary disk 951. The at least one converting portion is an area on the first surface 1010 or the second surface 1020 in which the wavelength converting components 960 described later are to be disposed; the at least one reflecting portion is an area on the first surface 1010 or the second surface 1020 that is provided with no wavelength converting component 960 thereon. Therefore, the at least one converting portion is provided with the color separating film and the wavelength converting components 960; the at least one reflecting portion is provided with the color separating film.

In this embodiment, the first surface 1010 preferably has a first converting portion 1011, a second converting portion 1012 and a first reflecting portion 1013; while the second surface 1020 preferably has a third converting portion 1021, a second reflecting portion 1022 and a third reflecting portion 1023.

Figure 12:
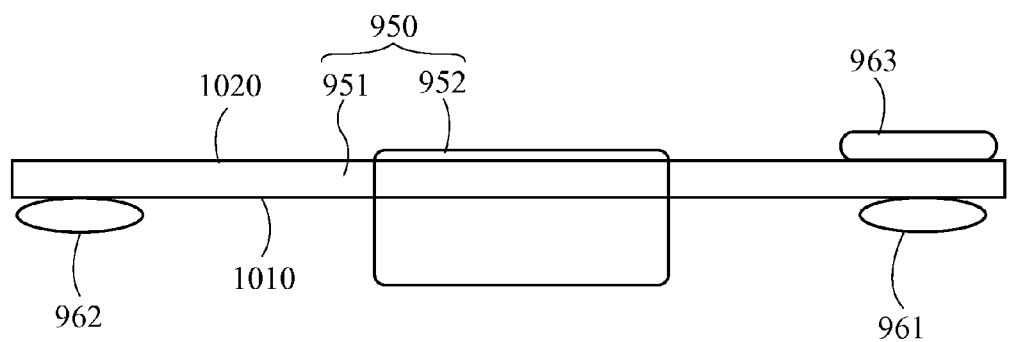
FIG. 12 is a side view of the timing controlling unit and the wavelength converting components of the illumination system shown in FIG. 9.

FIG. 12 illustrates the side view of the timing controlling unit and the wavelength converting components of the illumination system of FIG. 9. The wavelength converting components 960 are disposed on the rotary disk 951 and preferably on the periphery portion of the rotary disk 951 so that they can be located in the curved reflecting component 940. The number of wavelength converting components 960 is equal to the number of the converting portions of the timing controlling unit 950. In this embodiment, the timing controlling unit 950 has three converting portions, while the wavelength converting components 960 may comprise a first wavelength converting component 961, a second wavelength converting component 962 and a third wavelength converting component 963.

The first wavelength converting component 961, the second wavelength converting component 962 and the third wavelength converting component 963 are disposed on the first converting portion 1011, the second converting portion 1012 and the third converting portion 1021 respectively at locations corresponding to the focal point 944 of the curved reflecting component 940. Therefore, as the rotary disk 951 of the timing controlling unit 950 rotates, the first wavelength converting component 961, the second wavelength converting component 962 and the third wavelength converting component 963 can all pass by (i.e., from above or below) the focal point 944 of the curved reflecting component 940.

The first wavelength converting component 961, the second wavelength converting component 962 and the third wavelength converting component 963 are adapted to convert the first wavelength light into another wavelength light (i.e., a different color) respectively. The first wavelength converting component 961 adapted to convert the first wavelength light into a third wavelength light may be a green phosphor, and correspondingly, the third wavelength light may be a green wavelength light. The second wavelength converting component 962 adapted to convert the first wavelength light into a fourth wavelength light may be a red phosphor, and correspondingly, the fourth wavelength light may be a red wavelength light. The third wavelength converting component 963 adapted to convert the light into a fifth wavelength light may be a yellow phosphor, and correspondingly, the fifth wavelength light may be a yellow wavelength light.

The internal color separating mirror 971 may be disposed inside the curved reflecting component 940, and may be connected to one (e.g., the lower half) of the halves 9401. In addition, the internal color separating mirror 971 may be located on the outer side of the focal point 944 and at a certain distance from the periphery portion of the rotary disk 951. It is noted that the first surface 1010 of the rotary disk 951 faces the half (the lower half) 9401 that is connected to the internal color separating mirror 971.

The internal color separating mirror 971 is adapted to reflect the yellow wavelength light but allow the red and green wavelength light to pass therethrough. Therefore, when the third wavelength light (i.e., the green wavelength light) or the fourth wavelength light (i.e., the red wavelength light) is generated by the lower half 9401 of the curved reflecting component 940, the internal color separating mirror 971 can reflect the yellow wavelength light in the third and fourth wavelength light so that the yellow wavelength light cannot be projected out of the curved reflecting component 940.

Therefore, the third wavelength light (i.e., the green wavelength light) or the fourth wavelength light (i.e., the red wavelength light) projected from the curved reflecting component 940 will have a purer color, i.e., will be less likely to contain other colors.

The external color separating mirror 972 may be disposed between the second light source 920, the curved reflecting component 940 and the light homogenizing component 990, with a surface thereof facing towards the curved reflecting component 940 and the other surface thereof facing towards the second light source 920 and the light homogenizing component 990. The external color separating mirror 972 is adapted to reflect the blue wavelength light but allow the red, green and yellow wavelength light to pass therethrough. Therefore, the external color separating mirror 972 can reflect the second wavelength light (i.e., the blue wavelength light) from the second light source 920 and allow the third wavelength light (i.e., the green wavelength light), the fourth wavelength light (i.e., the red wavelength light) and the fifth wavelength light (i.e., the yellow wavelength light) from the curved reflecting component 940 to pass therethrough; and in this way, the lights of the different wavelengths can all be guided and coupled into the light homogenizing component 990.

The condensing lenses 980 are disposed adjacent to the curved reflecting component 940, the second light source 920 and the light homogenizing component 990 respectively to condense the light. In this embodiment, the condensing lenses may be collimators. The light homogenizing component 990 may be an optical component capable of homogenizing light such as an integration rod.

Hereinafter, the traveling path of the wavelength lights in the illumination system 900 will be described. It shall be firstly appreciated that the two first light sources 911, 912, the second light source 920 and the timing controlling unit 950 all operate (i.e., emit light or rotate) according to a particular timing sequence to output the green, red, yellow and blue wavelength light respectively.

In reference to FIG. 9, at a time point of the particular timing sequence, the lower first light source 911 emits the first wavelength light. The first wavelength light is reflected by the reflecting mirror 931, and then passes through the lower transmitting portion 941 to the timing controlling unit 950 located at the focal point 944 of the curved reflecting component 940.

In detail, the first wavelength light is projected towards the first wavelength converting component 961 on the first converting portion 1011 of the timing controlling unit 950. Upon receiving the first wavelength light, the first wavelength converting component 961 converts the first wavelength light into the third wavelength light (i.e., the green wavelength light). The third wavelength light is then reflected by the inner surface of the curved reflecting component 940 to be projected out from the curved reflecting component 940.

The yellow wavelength light within the third wavelength light is reflected by the internal color separating mirror 971 and cannot pass through the internal color separating mirror 971. Therefore, the yellow wavelength light within the third wavelength light cannot be projected out from the curved reflecting component 940 and, consequently, the third wavelength light that is finally projected out of the curved reflecting component 940 has a purer color. Then, the third wavelength light projected out from the curved reflecting component 940 further passes through the external color separating mirror 972 and the condensing lens 980 into the light homogenizing component 990.

At another time point of the particular timing sequence, the lower first light source 911 emits the first wavelength light. The first wavelength light is reflected by the reflecting mirror 931, and then passes through the lower transmitting portion 941 to the timing controlling unit 950 located at the focal point 944.

In detail, the first wavelength light is projected towards the second wavelength converting component 962 on the second converting portion 1012 of the timing controlling unit 950. Upon receiving the first wavelength light, the second wavelength converting component 962 converts the first wavelength light into the fourth wavelength light (i.e., the red wavelength light). The fourth wavelength light is reflected by the inner surface of the curved reflecting component 940 to be projected out from the curved reflecting component 940. The yellow wavelength light within the fourth wavelength light is reflected by the internal color separating mirror 971 and cannot be projected out from the curved reflecting component 940. Therefore, the fourth wavelength light that is finally projected out from the curved reflecting component 940 has a purer color. Then, the fourth wavelength light projected out from the curved reflecting component 940 passes through the external color separating mirror 972 and the condensing lens 980 into the light homogenizing component 990.

At a further time point of the particular timing sequence, the upper first light source 912 emits the first wavelength light. The first wavelength light is reflected by the reflecting mirror 932, and then passes through the upper transmitting portion 942 to the timing controlling unit 950 located at the focal point 944.

In detail, the first wavelength light is projected towards the third wavelength converting component 963 on the third converting portion 1021 of the timing controlling unit 950. Upon receiving the first wavelength light, the third wavelength converting component 963 converts the first wavelength light into the fifth wavelength light (i.e., the yellow wavelength light). The fifth wavelength light is reflected by the inner surface of the curved reflecting component 940 to be projected out from the curved reflecting component 940. Then, the fifth wavelength light projected out of the curved reflecting component 940 passes through the external color separating mirror 972 and the condensing lens 980 into the light homogenizing component 990.

At yet a further time point of the particular timing sequence, the second light source 920 emits the second wavelength light (i.e., the blue wavelength light). The second wavelength light is reflected by the external color separating mirror 972 and converged by the condensing lens 980 into the light homogenizing component 990.

After traveling into the light homogenizing component 990, the second, third, fourth and fifth wavelength light can be homogenized by the light homogenizing component 990 to form a light beam with uniform brightness. The light beam with uniform brightness may be further projected into an imaging system (not shown) for use by the imaging system.

It shall be appreciated that light will be scattered at a large angle when coming into contact with the first wavelength converting component 961, the second wavelength converting component 962 and the third wavelength converting component 963. Therefore, the first wavelength light will also be scattered at a large angle when being converted by the first wavelength converting component 961, the second wavelength converting component 962 and the third wavelength converting component 963 into the third wavelength light, the fourth wavelength light and the fifth wavelength light respectively. However, by using the first reflecting portion 1013, the second reflecting portion 1022 and the third reflecting portion 1023 of the timing controlling unit 950, the scattered light can be reflected to the inner surface of the curved reflecting component 940 for recycling.

Furthermore, although the first wavelength light generated by the first light sources 911, 912 is a blue light, in actuality, the blue light is more of a violet light. As a result, the illumination system 900 takes the first wavelength light from the second light source 920 as the main output of the blue light.

Furthermore, because the transmitting portions 941, 942 of the curved reflecting component 940 are each provided with a color separating film, the third to fifth wavelength light generated within the curved reflecting component 940 cannot be projected out of the transmitting portions 941, 942, thereby reducing the light loss of the third to fifth wavelength light.

Additionally, in other implementations (not shown), the two first light sources 911, 912 may be directly aligned with the transmitting portions 941, 942 to emit the first wavelength light into the curved reflecting component 940 straightforwardly. In this way, the need of the reflecting mirrors 931, 932 can be eliminated in the illumination system 900.

It shall be appreciated that in addition to the aforesaid implementations, the converting portions and the reflecting portions of the rotary disk 951 may also be arranged in other preferred ways, which will be described as follows.

Figure 13A:
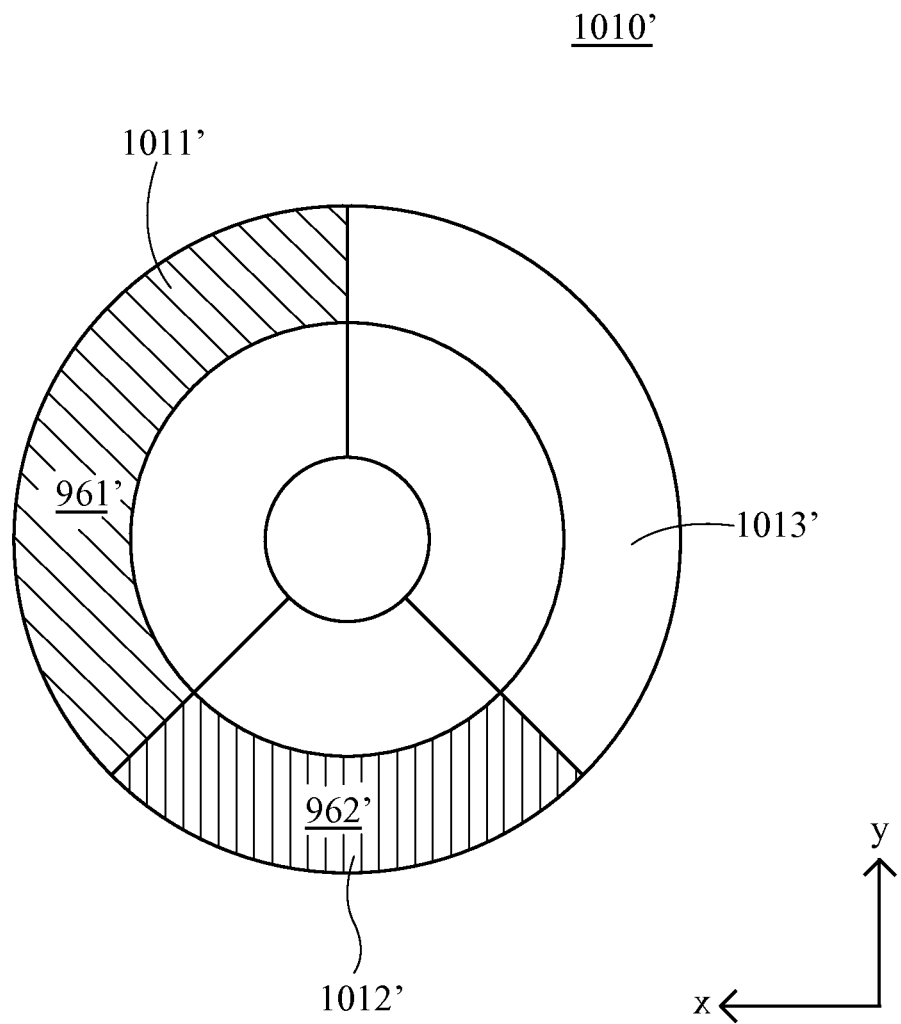
FIG. 13A is a top view of the timing controlling unit and the wavelength converting components of the illumination system shown in FIG. 9 which are arranged in another way.
Figure 13B:
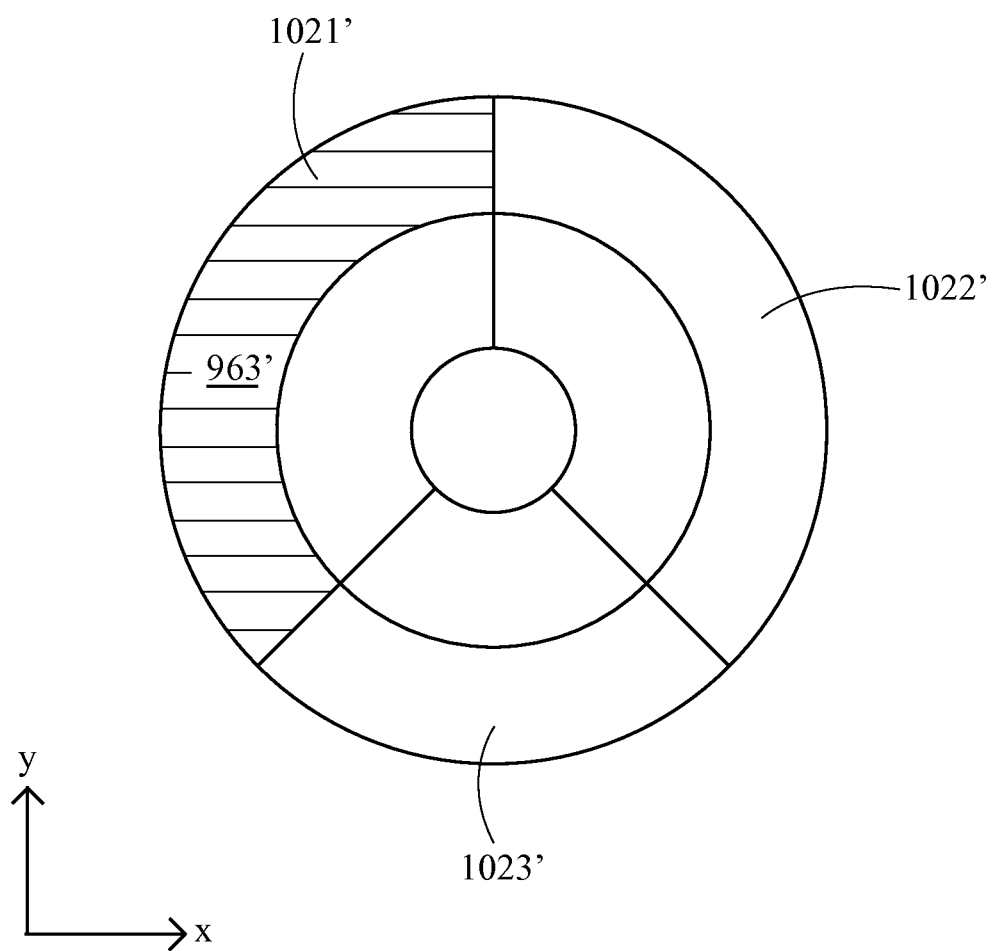
FIG. 13B is a bottom view of the timing controlling unit and the wavelength converting components of the illumination system shown in FIG. 9 which are arranged in another way.

FIGS. 13A and 13B are the top and bottom view respectively of the timing controlling unit and the wavelength converting components in the illumination system of FIG. 9 which are arranged in another way. The first surface 1010' of the rotary disk 951 has a first converting portion 1011', a second converting portion 1012' and a first reflecting portion 1013', while the second surface 1020' has a third converting portion 1021', a second reflecting portion 1022' and a third reflecting portion 1023'. The first wavelength converting component 961', the second wavelength converting component 962' and the third wavelength converting component 963' are disposed on the first converting portion 1011', the second converting portion 1012' and the third converting portion 1021' respectively.

Unlike what is shown in FIGS. 11A and 11B, the third converting portion 1021' (the third wavelength converting component 963') is not opposite to the first converting portion 1011' (the first wavelength converting component 961'); that is, the third converting portion 1021' is not located directly over the first converting portion 1011'. Instead, the first converting portion 1011' is opposite to and directly below the second reflecting portion 1022'; the second converting portion 1012' is opposite to and directly below the third reflecting portion 1023'; and the third converting portion 1021' is opposite to and directly over the first reflecting portion 1013'.

In other words, along the axial direction of the rotary disk 951, the first converting portion 1011' and the second reflecting portion 1022' may overlap each other; the second converting portion 1012' and the third reflecting portion 1023' may overlap each other; and the third converting portion 1021' and the first reflecting portion 1013' may overlap each other.

Additionally, the first reflecting portion 1013', the second reflecting portion 1022' and the third reflecting portion 1023' are each provided with a color separating film so that the first wavelength light (i.e., the blue light) can pass through the first reflecting portion 1013', the second reflecting portion 1022' or the third reflecting portion 1023' to come into contact with the first converting portion 1011', the second converting portion 1012' or the third converting portion 1021'. The third, fourth and fifth wavelength light cannot pass through the first reflecting portion 1013', the second reflecting portion 1022' or the third reflecting portion 1023'.

With the structure of the timing controlling unit 950 shown in FIG. 13A and FIG. 13B, the two first light sources 911, 912 of the illumination system 900 can emit the first wavelength light simultaneously at each time point; and then, the two first wavelength lights are projected to the timing controlling unit 950 located at the focal point 944 of the curved reflecting component 940 respectively.

In detail, at a time point, the first wavelength light emitted by the first light source 911 is projected towards the first wavelength converting component 961' on the first converting portion 1011', and is then converted by the first wavelength converting component 961' into the third wavelength light. In addition, the other first wavelength light emitted by the first light source 912 passes through the second reflecting portion 1022' to come into contact with the first wavelength converting component 961', and is then converted by the first wavelength converting component 961' into the third wavelength light. In this way, both of the first light sources 911 and 912 can generate the third wavelength light in the lower half 9401.

At another time point, the first wavelength light emitted by the first light source 911 is projected towards the second wavelength converting component 962' on the second converting portion 1012', and is then converted by the second wavelength converting component 962' into the fourth wavelength light; the first wavelength light emitted by the other first light source 912 passes through the third reflecting portion 1023' to come into contact with the second wavelength converting component 962', and is then converted by the second wavelength converting component 962' into the fourth wavelength light. In this way, both of the first light sources 911 and 912 can generate the fourth wavelength light in the lower half 9401.

At a further time point, the first wavelength light emitted by the first light source 912 is projected towards the third wavelength converting component 963' on the third converting portion 1021', and is then converted by the third wavelength converting component 963' into the fifth wavelength light; the first wavelength light emitted by the first light source 911 passes through the first reflecting portion 1013' to come into contact with the third wavelength converting component 963', and is then converted by the third wavelength converting component 963' into the fifth wavelength light. In this way, both of the first light sources 911 and 912 can generate the fifth wavelength light in the upper half 9401.

It can be known from the above descriptions that as compared to the cases in which the first light source 911 or 912 emits the first wavelength light separately, having the first light sources 911 and 912 emit the first wavelength light simultaneously can double the energy of the third to the fifth wavelength light outputted by the curved reflecting component 940. In other words, if there is no need to double the energy of the third to fifth wavelength lights outputted by the curved reflecting component 940, the energy of the first wavelength light emitted by the first light sources 911 and 912 can be reduced.

What described above is the illumination system 900 of the fifth preferred embodiment.

Figure 14:
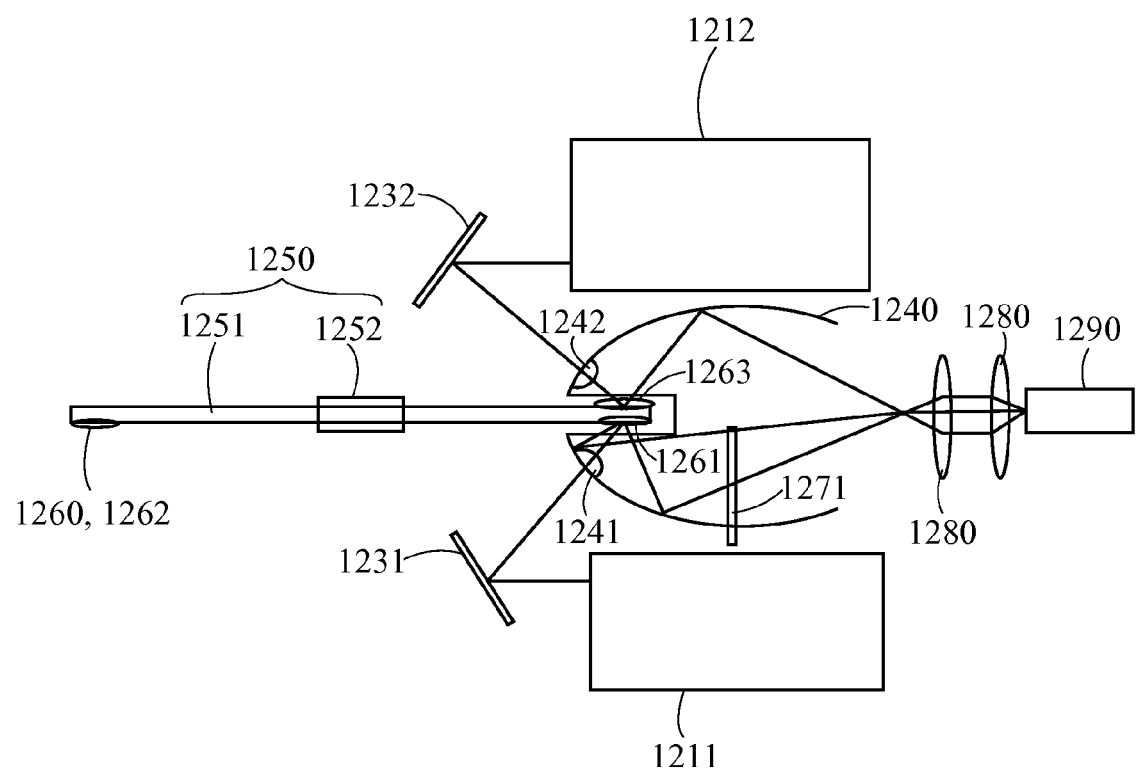
FIG. 14 is a schematic view of the sixth embodiment of the illumination system according to the present invention.

FIG. 14 illustrates a schematic view of an illumination system for a projector according to the sixth preferred embodiment of the present invention. The illumination system 1200 of the sixth embodiment comprises two first light sources 1211, 1212, two reflecting mirrors 1231, 1232, a curved reflecting component 1240, a timing controlling unit 1250, a plurality of wavelength converting components 1260, an internal color separating mirror 1271, a plurality of condensing lenses 1280 and a light homogenizing component 1290.

The illumination system 1200 of the sixth embodiment is roughly the same as the illumination system 900 of the fifth embodiment, but differs mainly in the following ways: the illumination system 1200 does not comprise the second light source 920 and the external color separating mirror 972 of the illumination system 900 and the rotary disk 1251 of the timing controlling unit 1250 is different from the rotary disk 951 of the timing controlling unit 950 of the fifth embodiment. Hereinafter, only differences between these two embodiments will be described, while descriptions of the identical components will be omitted.

Figure 15A:
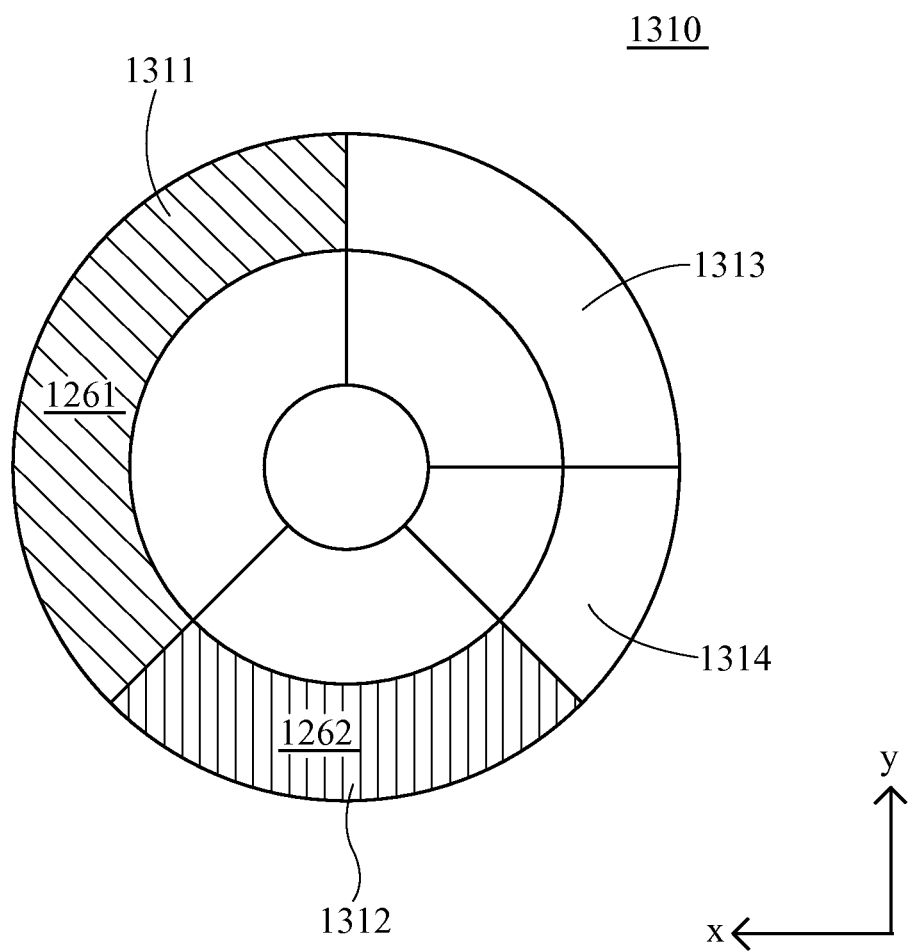
FIG. 15A is a top view of the timing controlling unit of the illumination system shown in FIG. 14.
Figure 15B:
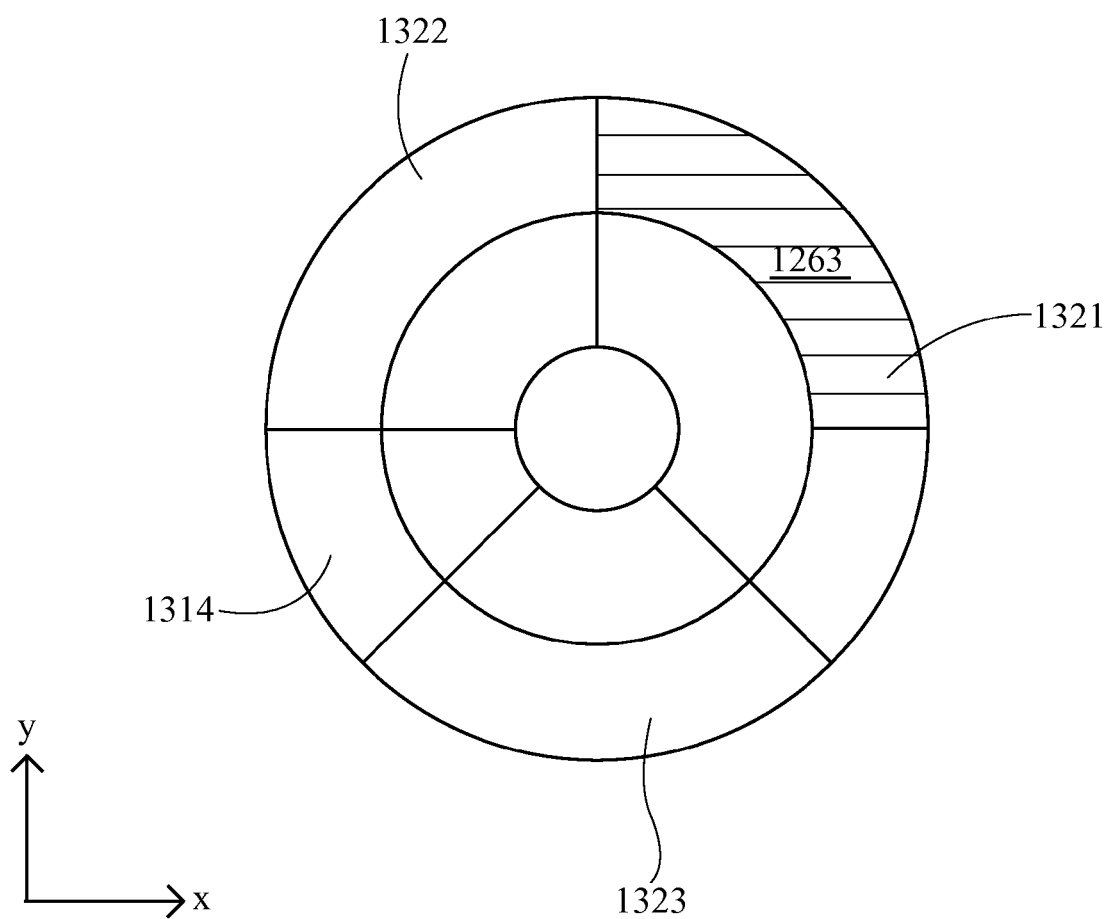
FIG. 15B is a bottom view of the timing controlling unit of the illumination system shown in FIG. 14.

FIGS. 15A and 15B illustrate the top and bottom view of the timing controlling unit and the wavelength converting components in the illumination system of FIG. 14 respectively. The rotary disk 1251 has a first surface 1310 and a second surface 1320, each of which has at least one converting portion and at least one reflecting portion. In this embodiment, the first surface 1310 preferably has a first converting portion 1311, a second converting portion 1312, a first reflecting portion 1313 and a transmitting portion 1314. The second surface 1320 preferably has a third converting portion 1321, a second reflecting portion 1322, a third reflecting portion 1323 and a transmitting portion 1314.

Corresponding to the number of the converting portions, the wavelength converting components 1260 may comprise a first wavelength converting component 1261, a second wavelength converting component 1262 and a third wavelength converting component 1263. The first wavelength converting component 1261, the second wavelength converting component 1262 and the third wavelength converting component 1263 are disposed on the first converting portion 1311, the second converting portion 1312 and the third converting portion 1321 respectively at locations corresponding to the focal point (not shown) of the curved reflecting component 1240. Therefore, as the rotary disk 1251 of the timing controlling unit 1250 rotates, the first wavelength converting component 1261, the second wavelength converting component 1262 and the third wavelength converting component 1263 can pass by the focal point of the curved reflecting component 1240 respectively.

The first wavelength converting component 1261 adapted to convert the light into a third wavelength light may be a green phosphor, and correspondingly, the third wavelength light may be a green wavelength light; the second wavelength converting component 1262 adapted to convert the light into a fourth wavelength light may be a red phosphor, and correspondingly, the fourth wavelength light may be a red wavelength light; and the third wavelength converting component 1263 adapted to convert the light into a fifth wavelength light may be a yellow phosphor, and correspondingly, the fifth wavelength light may be a yellow wavelength light.

Hereinafter, the traveling paths of the wavelength lights in the illumination system 1200 of the sixth embodiment will be described. It shall be firstly appreciated that the two first light sources 1211, 1212 and the timing controlling unit 1250 all operate according to a particular timing sequence to output the green wavelength light, the red wavelength light, the yellow wavelength light and the blue wavelength light respectively.

Referring to FIG. 14, at a time point of the particular timing sequence, the lower first light source 1211 emits the first wavelength light. The first wavelength light is reflected by the reflecting mirror 1231, and then passes through the transmitting portion 1241 to the timing controlling unit 1250 located at the focal point of the curved reflecting component 1240.

In detail, the first wavelength light is projected to the first wavelength converting component 1261 on the first converting portion 1311 of the timing controlling unit 1250. Upon receiving the first wavelength light, the first wavelength converting component 1261 converts the first wavelength light into the third wavelength light (i.e., the green wavelength light). The third wavelength light is projected out from the curved reflecting component 1240, and then passes through the condensing lenses 1280 into the light homogenizing component 1290. The internal color separating mirror 1271 can make the color of the third wavelength light projected out from the curved reflecting component 1240 purer.

At another time point of the particular timing sequence, the lower first light source 1211 emits the first wavelength light. The first wavelength light is reflected by the reflecting mirror 1231, and then passes through the transmitting portion 1241 to the timing controlling unit 1250 located at the focal point of the curved reflecting component 1240.

In detail, the first wavelength light is projected to the second wavelength converting component 1262 on the second converting portion 1312 of the timing controlling unit 1250. Upon receiving the first wavelength light, the second wavelength converting component 1262 converts the first wavelength light into the fourth wavelength light (i.e., the red wavelength light). The fourth wavelength light is projected out from the curved reflecting component 1240, and then passes through the condensing lenses 1280 into the light homogenizing component 1290. The internal color separating mirror 1271 can make the color of the fourth wavelength light projected out from the curved reflecting component 1240 purer.

At a further time point of the particular timing sequence, the upper first light source 1212 emits the first wavelength light. The first wavelength light is reflected by the reflecting mirror 1232, and then passes through the transmitting portion 1242 to the timing controlling unit 1250 located at the focal point of the curved reflecting component 1240.

In detail, the first wavelength light is projected to the third wavelength converting component 1263 on the third converting portion 1321 of the timing controlling unit 1250. Upon receiving the first wavelength light, the third wavelength converting component 1263 converts the first wavelength light into the fifth wavelength light (i.e., the yellow wavelength light). The fifth wavelength light is projected out from the curved reflecting component 1240, and then passes through the condensing lenses 1280 into the light homogenizing component 1290.

At yet a further time point of the particular timing sequence, the lower first light source 1211 and the upper first light source 1212 emit the first wavelength light (i.e., the blue wavelength light) simultaneously. The two first wavelength lights are reflected by the lower reflecting mirror 1231 and the upper reflecting mirror 1232 respectively, and then pass through the transmitting portions 1241, 1242 to the timing controlling unit 1250 located at the focal point of the curved reflecting component 1240.

In detail, the first wavelength lights are projected to the transmitting portion 1314 of the timing controlling unit 1250 and then pass through the transmitting portion 1314. Because no wavelength converting component is disposed on the transmitting portion 1314, no wavelength (color) conversion is made on the first wavelength lights. The first wavelength lights are projected out from the curved reflecting component 1240, and then pass through the condensing lenses 1280 into the light homogenizing component 1290.

In other implementations, the transmitting portion 1314 may be coated with a blue phosphor (not shown) to further purify the blue wavelength light of the first wavelength light.

After traveling into the light homogenizing component 1290, the first wavelength light, the third wavelength light, the fourth wavelength light and the fifth wavelength light can be homogenized by the light homogenizing component 1290 to form a light beam with uniform brightness. The light beam can further travel into an imaging system (not shown) for use by the imaging system.

It shall be appreciated that because the first, third, fourth and fifth wavelength light all need to be reflected and converged by the curved reflecting component 1240, the surface of the curved reflecting component 1240 may be suitably provided with a reflecting film capable of reflecting the first, third, fourth and fifth wavelength light instead of a color separating film incapable of reflecting the first wavelength light.

Additionally, in addition to the aforesaid implementations, the converting portions and the reflecting portions of the rotary disk 1251 may also be arranged in other preferred ways, which will be described as follows.

Figure 16A:
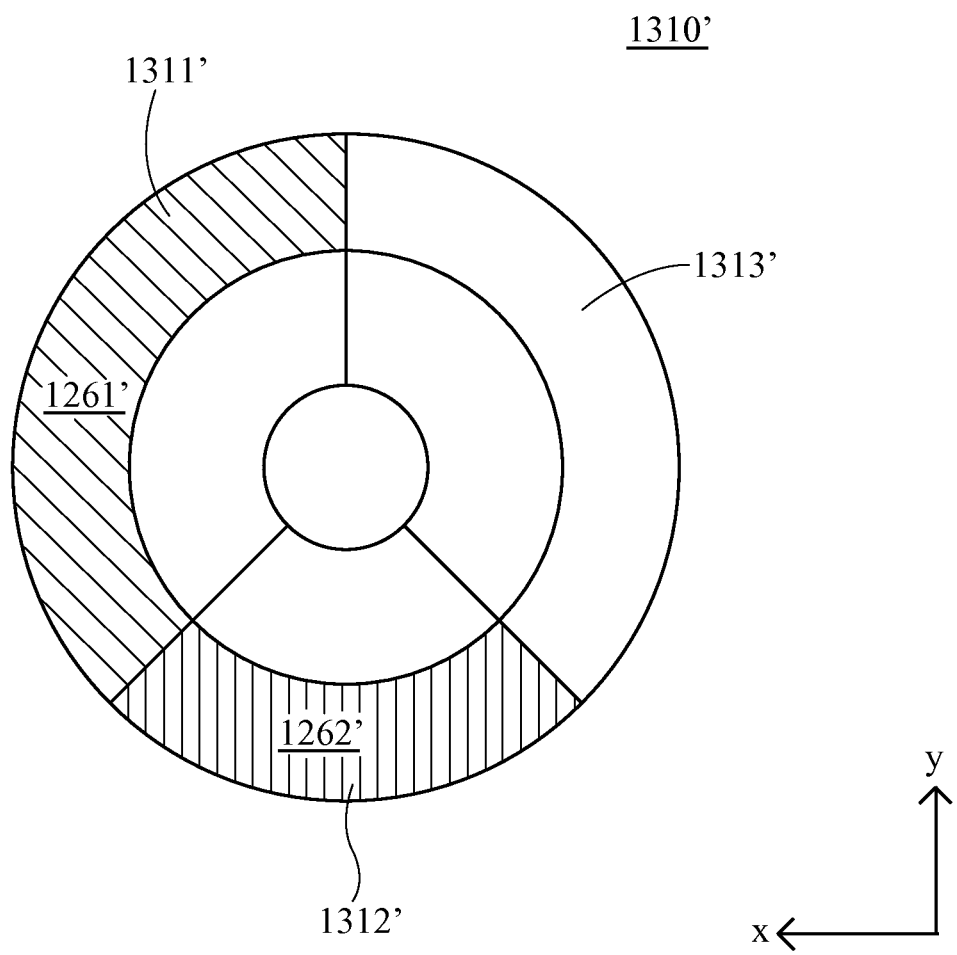
FIG. 16A is a top view of the timing controlling unit and the wavelength converting components of the illumination system shown in FIG. 14 which are arranged in another way.
Figure 16B:
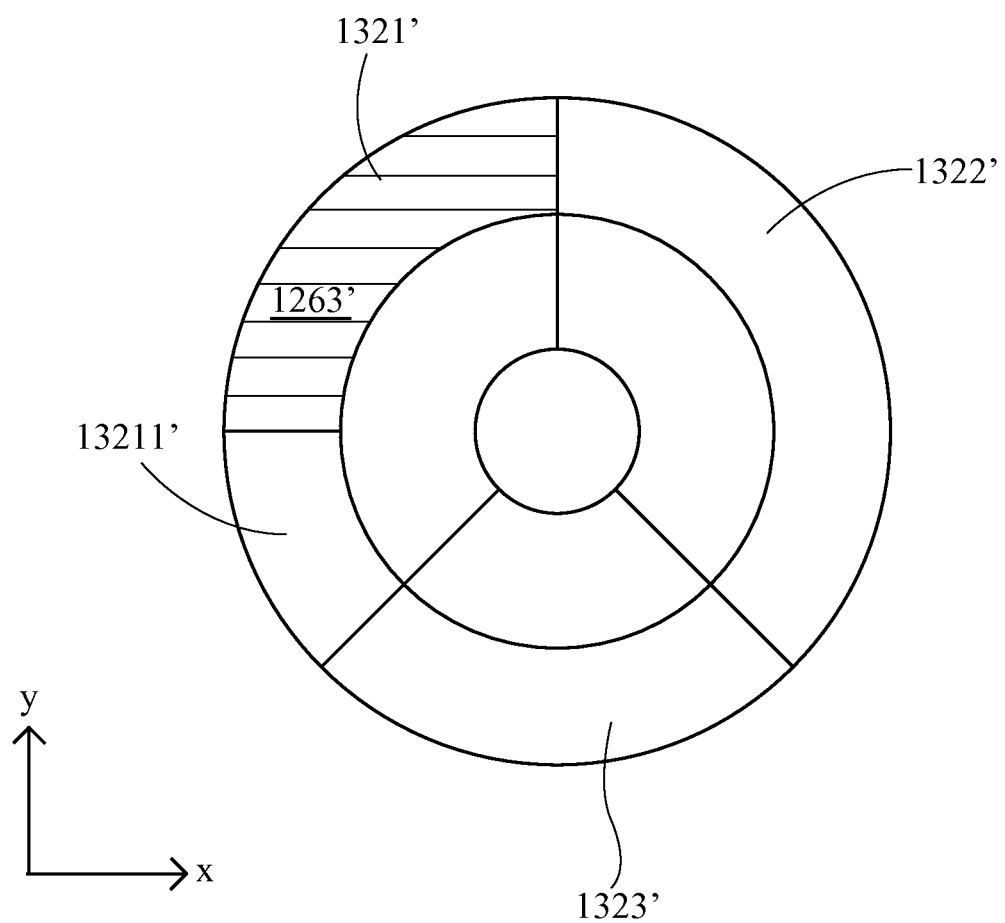
FIG. 16B is a bottom view of the timing controlling unit and the wavelength converting components of the illumination system shown in FIG. 14 which are arranged in another way.

FIGS. 16A and 16B show the top and bottom view respectively of the timing controlling unit and the wavelength converting components in the illumination system of FIG. 9 which are arranged in another way. The first surface 1310' of the rotary disk 1251 has a first converting portion 1311', a second converting portion 1312' and a first reflecting portion 1313'. The second surface 1320' has a third converting portion 1321', a second reflecting portion 1322' and a third reflecting portion 1323'. The first wavelength converting component 1261', the second wavelength converting component 1262' and the third wavelength converting component 1263' are disposed on the first converting portion 1311', the second converting portion 1312' and the third converting portion 1321' respectively.

Unlike what is shown in FIGS. 15A and 15B, the third converting portion 1321' (the third wavelength converting component 1263') is not opposite to the first converting portion 1311' (the first wavelength converting component 1261'); that is, the third converting portion 1321' is not located above the first converting portion 1311'. Instead, the first converting portion 1311' is opposite to the second reflecting portion 1322'; the second converting portion 1312' is opposite to the third reflecting portion 1323'; and the third converting portion 1321' is opposite to the first reflecting portion 1313'.

The first reflecting portion 1313', the second reflecting portion 1322' and the third reflecting portion 1323' are each provided with a color separating film, which allows the first wavelength light (i.e., the blue light) to pass therethrough but reflects the third, fourth and fifth wavelength light (i.e., the third, fourth and fifth wavelength light cannot pass through the color separating film).

Furthermore, the third converting portion 1321' is partially provided with the third wavelength converting component 1263'. An area 13211' of the third converting portion 1321' has no third wavelength converting component 1263' disposed thereon. The area 13211' may be provided with a color separating film to allow only the first wavelength light to pass therethrough.

With the structure of the timing controlling unit 1250 shown in FIGS. 16A and. 16B, the two first light sources 1211, 1212 of the illumination system 1200 can emit the first wavelength light simultaneously at each time point; and then, the two first wavelength lights are projected to the timing controlling unit 1250 located at the focal point of the curved reflecting component 1240 respectively.

In detail, at a certain time point, the first wavelength light emitted by the first light source 1211 is projected towards the first wavelength converting component 1261' on the first converting portion 1311', and is then converted by the first wavelength converting component 1261' into the third wavelength light. The first wavelength light emitted by the first light source 1212 passes through the second reflecting portion 1322' to come into contact with the first wavelength converting component 1261', and is then converted by the first wavelength converting component 1261' into the third wavelength light. In this way, both the first light sources 1211 and 1212 can cause generation of the third wavelength light in the lower half.

At another time point, the first wavelength light emitted by the first light source 1211 is projected towards the second wavelength converting component 1262' on the second converting portion 1312', and is then converted by the second wavelength converting component 1262' into the fourth wavelength light. The first wavelength light emitted by the first light source 1212 passes through the third reflecting portion 1323' to come into contact with the second wavelength converting component 1262', and is then converted by the second wavelength converting component 1262' into the fourth wavelength light. In this way, both of the first light sources 1211 and 1212 can generate the fourth wavelength light in the lower half.

At a further time point, the first wavelength light emitted by the first light source 1212 is projected towards the third wavelength converting component 1263' on the third converting portion 1321', and is then converted by the third wavelength converting component 1263' into the fifth wavelength light. The first wavelength light emitted by the first light source 1211 passes through the first reflecting portion 1313' to come into contact with the third wavelength converting component 1263', and is then converted by the third wavelength converting component 1263' into the fifth wavelength light. In this way, both of the first light sources 1211 and 1212 can generate the fifth wavelength light in the upper half.

At yet a further time point, the first wavelength light emitted by the first light source 1212 is projected towards the area 13211' that does not compromise a third wavelength converting component 1263' on the third converting portion 1321', and passes through the area 13211'. The first wavelength light emitted by the first light source 1211 passes through the first reflecting portion 1313' and enters into the lower half via the area 13211'. Because neither of the first wavelength lights comes into contact on any wavelength converting component, no wavelength (color) conversion occurs thereon.

It can be known from the above description that compared to the case in which the first light source 1211 or 1212 emits the first wavelength light separately, when the first light sources 1211 and 1212 emit the first wavelength light simultaneously, the energy of the first wavelength light is doubled; consequently, the third to fifth wavelength light is outputted by the curved reflecting component 1240. In other words, if there is no need to double the energy of the first wavelength light, and the third to fifth wavelength light is outputted by the curved reflecting component 1240, the energy of the first wavelength light emitted by the first light sources 1211 and 1212 can be reduced.

According to the above descriptions, some of the preferred embodiments of the illumination system according to the present invention only need to be provided with two light sources (e.g., blue light sources) and one wavelength converting component to generate the first wavelength light (e.g., the blue light), the third wavelength light (e.g., the green light), the fourth wavelength light (e.g., the red light) and the fifth wavelength light (e.g., the yellow light), which have uniform brightness and are concentrated for use in a projector. Thereby, problems such as divergent projection angles and low light formation efficiency in the prior art solid state light sources can be avoided. Meanwhile, by using the internal color separating mirror, the colors of the third wavelength light (e.g., the green light) and the fourth wavelength light (e.g., the red light) that are projected outwards are made purer. Furthermore, the blue light can be enhanced by additionally providing a second light source (e.g., a blue light source).

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An illumination system for a projector, comprising: a first light source for providing a first wavelength light; a first timing controlling unit for dividing the first wavelength light into a first timing portion and a second timing portion; a curved reflecting component, having a curved surface, at least one hole, a focal point and an opening, wherein the hole is formed on the curved surface, and the opening is spaced apart from the hole; a second timing controlling unit for dividing the first timing portion of the first wavelength light into a third timing portion and a fourth timing portion, wherein the third timing portion and the second timing portion have the same timing and the second timing unit comprises a rotary disk that passes through the opening to be partly located within the curved reflecting component, the rotary disk comprising at least one converting portion and at least one reflecting portion, and a wavelength converting component formed on the at least one converting portion and disposed at the focal point for converting the first timing portion of the first wavelength light into a second wavelength light; wherein: the first timing portion of the first wavelength light passes through the hole to the wavelength converting component disposed at the focal point, and the second wavelength light is emitted outwards from the opening of the curved reflecting component and the wavelength converting component is intermittently disposed at the focal point with the rotation of the rotary disk so as to convert the fourth timing portion of the first timing portion of the first wavelength light into the second wavelength light, and the third timing portion is reflected on the at least one reflecting portion to become the second timing portion.

2. The illumination system of claim 1, wherein the first timing controlling unit has at least one transmitting portion and at least one reflecting portion, the first wavelength light passes through the at least one transmitting portion to become one of the first timing portion and the second timing portion, and the first wavelength light is reflected on the at least one reflecting portion to become the other one of the first timing portion and the second timing portion.

3. The illumination system of claim 1, wherein the first timing controlling unit has a mirror wheel or a polygonal reflecting mirror.

4. The illumination system of claim 1, wherein the second timing controlling unit comprises a mirror wheel or a polygonal reflecting mirror.

5. The illumination system of claim 1, wherein the wavelength converting component is a green phosphor.

6. The illumination system of claim 1, wherein the curved surface is an ellipsoidal surface or a parabolic surface.

7. The illumination system of claim 1, wherein a color separating film is disposed on the at least one hole, the first wavelength light passes through the at least one hole via the color separating film, and the second wavelength light is reflected by the color separating film.

8. An illumination system for a projector, comprising:
   two first light sources, each providing a first wavelength light;
   a curved reflecting component, disposed between the two first light sources, and having two halves, a through groove and two transmitting portions, wherein the through groove is disposed between the two halves, and the two transmitting portions are disposed on the two halves respectively;
   a timing controlling unit, having a rotary shaft and a rotary disk, wherein the rotary shaft is rotatable and the rotary disk is fixedly connected with the rotary shaft so that the rotary disk rotatably passes through the through groove; and
   a plurality of wavelength converting components, disposed on the rotary disk, wherein each of the wavelength converting components converts the first wavelength light into another wavelength light.

9. The illumination system of claim 8, wherein the timing controlling unit has a first surface and a second surface opposite to the first surface, the first surface has a first converting portion, a second converting portion and a first reflecting portion, and the second surface has a third converting portion, a second reflecting portion and a third reflecting portion; the wavelength converting components comprises a first wavelength converting component, a second wavelength converting component and a third wavelength converting component, the first wavelength converting component is disposed on the first converting portion, the second wavelength converting component is disposed on the second converting portion, and the third wavelength converting component is disposed on the third converting portion.

10. The illumination system of claim 9, further comprising an internal color separating mirror which is disposed within the curved reflecting component and connected with one of the halves, wherein the first surface of the timing controlling unit faces the half that is connected with the internal color separating mirror.

11. The illumination system of claim 9, wherein each of the first wavelength converting component, the second wavelength converting component and the third wavelength converting component is one of a green phosphor, a red phosphor and a yellow phosphor.

12. The illumination system of claim 9, wherein each of the first surface and the second surface has a transmitting portion for enabling the first wavelength light to pass therethrough.

13. The illumination system of claim 9, wherein each of the first reflecting portion, the second reflecting portion and the third reflecting portion is provided with a color separating film so as to enable the first wavelength light to pass through the first reflecting portion, the second reflecting portion or the third reflecting portion; and the first converting portion is opposite to the second reflecting portion, the second converting portion is opposite to the third reflecting portion, and the third converting portion is opposite to the first reflecting portion, so as to enable the first wavelength light to impinge on the first converting portion, the second converting portion or the third converting portion after passing through the first reflecting portion, the second reflecting portion or the third reflecting portion.

14. The illumination system of claim 13, wherein the third converting portion is partly provided with the third wavelength converting component.

15. The illumination system of claim 8, wherein the curved reflecting component has at least one curved surface, which is an ellipsoidal surface or a parabolic surface.

16. The illumination system of claim 8, wherein each of the two transmitting portions is a through hole or a transparent material.

17. The illumination system of claim 8, wherein the curved reflecting component is made of a transparent material, and a color separating film is disposed on a surface of the curved reflecting component for enabling the first wavelength light to pass through the curved reflecting component.

* * * * *